(12) United States Patent
Blanchard et al.

(10) Patent No.: US 10,670,174 B2
(45) Date of Patent: Jun. 2, 2020

(54) DIELECTRIC FITTING FOR PRESSURE REGULATOR

(71) Applicant: Marshall Excelsior Co., Marshall, MI (US)

(72) Inventors: Frederick William Blanchard, Caldwell, ID (US); Jonathan William Sanders, Portage, MI (US)

(73) Assignee: Marshall Excelsior Co., Marshall, MI (US)

( * ) Notice: Subject to any disclaimer, the term of this patent is extended or adjusted under 35 U.S.C. 154(b) by 4 days.

(21) Appl. No.: 15/907,577

(22) Filed: Feb. 28, 2018

(65) Prior Publication Data

US 2019/0264847 A1    Aug. 29, 2019

(51) Int. Cl.
*F16L 25/02* (2006.01)
*G05D 16/06* (2006.01)

(52) U.S. Cl.
CPC .......... *F16L 25/023* (2013.01); *F16L 25/026* (2013.01); *G05D 16/0683* (2013.01)

(58) Field of Classification Search
USPC .................................................. 285/368, 412
See application file for complete search history.

(56) References Cited

U.S. PATENT DOCUMENTS

| | | | | |
|---|---|---|---|---|
| 426,121 A * | 4/1890 | Gennert | ............... | F16L 25/026 285/50 |
| 572,124 A * | 12/1896 | McFlroy | ............... | F16L 23/167 285/13 |
| 1,423,754 A * | 7/1922 | Clark | ............... | F16L 55/178 285/337 |
| 1,491,032 A * | 4/1924 | Croker | ............... | F16L 25/026 174/85 |
| 1,525,647 A * | 2/1925 | Haughey | ............... | F16L 23/032 285/412 |
| 1,574,690 A | 2/1926 | Radabaugh | | |
| 1,592,175 A * | 7/1926 | Boyd | ............... | F16L 25/026 138/DIG. 6 |
| 2,465,669 A * | 3/1949 | Tudor | ............... | F16L 25/026 285/368 |
| 2,653,834 A * | 9/1953 | Purkhiser | ............... | F16L 25/026 285/50 |
| 3,278,202 A * | 10/1966 | Smith | ............... | F16L 23/02 285/368 |
| 3,298,719 A * | 1/1967 | Bills | ............... | F16L 23/20 277/614 |
| 3,782,419 A | 1/1974 | Hanson | | |
| 3,937,496 A | 2/1976 | Zahid | | |
| 4,654,747 A | 3/1987 | Covey | | |
| 5,078,431 A * | 1/1992 | Hale | ............... | F16L 25/026 285/47 |
| 5,340,161 A * | 8/1994 | Bagnulo | ............... | F16L 25/026 285/368 |
| 5,437,482 A * | 8/1995 | Curtis | ............... | F16L 23/028 285/148.13 |

(Continued)

*Primary Examiner* — Robert K Arundale
(74) *Attorney, Agent, or Firm* — Howard & Howard Attorneys PLLC

(57) ABSTRACT

A dielectric fitting for a pressure regulator includes a flange adapted to be disposed next to a housing of the pressure regulator, an isolator plate disposed next to the flange and adapted to be disposed between the flange and the housing, and an isolator cover disposed between the flange and the isolator plate to electrically isolate the flange from the housing.

26 Claims, 20 Drawing Sheets

(56) References Cited

U.S. PATENT DOCUMENTS

| | | | |
|---|---|---|---|
| 5,447,340 A | | 9/1995 | Sands et al. |
| 5,723,814 A | * | 3/1998 | Kolbl ................... H02G 5/068 |
| | | | 174/151 |
| 6,050,614 A | * | 4/2000 | Kirkpatrick ........... F16L 23/024 |
| | | | 123/469 |
| 7,458,613 B2 | | 12/2008 | Spears |
| 7,604,217 B2 | * | 10/2009 | Lum ..................... F16K 5/0626 |
| | | | 251/148 |
| 9,169,953 B2 | | 10/2015 | Cavagna |
| 2007/0007768 A1 | * | 1/2007 | Ho ....................... F16L 23/0283 |
| | | | 285/368 |
| 2010/0013220 A1 | * | 1/2010 | Rao ....................... F16J 15/104 |
| | | | 285/368 |
| 2015/0176730 A1 | * | 6/2015 | Kempf ................. F16L 23/024 |
| | | | 285/368 |
| 2016/0123510 A1 | * | 5/2016 | Nashery ................. F04B 53/10 |
| | | | 285/368 |

\* cited by examiner

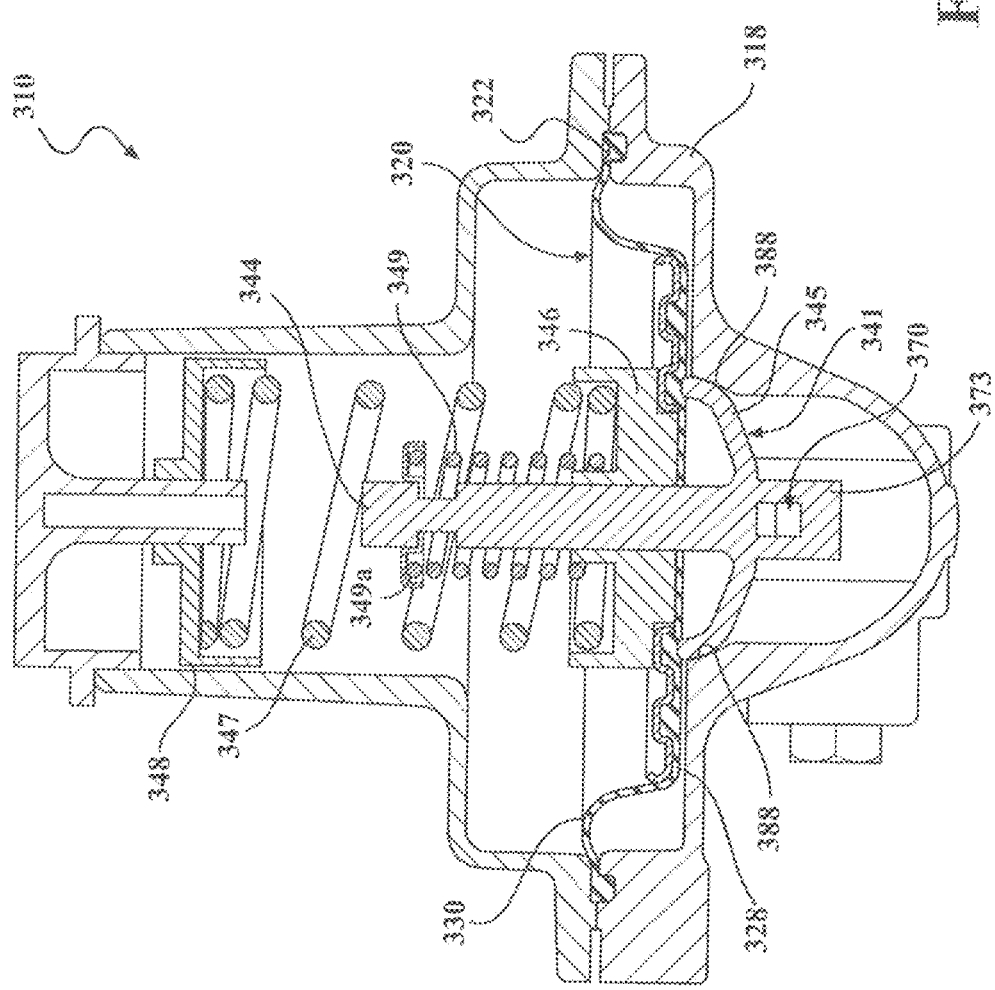

DIELECTRIC FITTING FOR PRESSURE REGULATOR

BACKGROUND OF THE INVENTION

1. Field of the Invention

The present invention relates generally to pressure regulators and, more particularly to, a dielectric fitting for a pressure regulator.

2. Description of the Related Art

Pressure regulators are configured to produce a desired output pressure of a fluid from an input pressure of the fluid. Often, pressure regulators are configured to reduce the input pressure so that the output pressure is substantially less than the input pressure.

Single stage and dual stage pressure regulators are available to reduce the input pressure. Single stage regulators are often employed to regulate fluid pressure in gas appliances such as gas grills. Dual stage pressure regulators are often employed for regulating fluid pressure of natural gas or propane in domestic fluid systems. For instance, one dual stage pressure regulator has a first stage that reduces the fluid pressure from a storage tank, such as a propane storage tank, to around 10 psi, while a second stage reduces the 10 psi input to around 11 inches water column output pressure. Some regulations require the output pressure not to exceed 2 psi.

Typically, pressure regulators include a housing formed of upper and lower housing portions that are connected together with fasteners and a diaphragm located between the upper and lower housing portions. An outer periphery of the diaphragm often has a lip shaped to fit inside an annular recess in the lower housing portion to help seal between the upper and lower housing portions. Generally, the diaphragm of the pressure regulator is shaped to have an inner annular section configured to raise and lower during operation of the pressure regulator. The diaphragm has a flexible connecting section radially extending between the inner annular section and the outer lip. The flexible connecting section has a thickness less than a thickness of the inner annular section and the lip. A diaphragm plate is positioned on top of the inner annular section to provide additional rigidity to the inner annular section as the inner annular section raises and lowers during operation. In some conventional pressure regulators, projections on the lower housing portion suspend a bottom surface of the inner annular section of the diaphragm above an inner surface of the lower housing portion to reduce contact between the bottom surface and the lower housing portion.

Generally, the pressure regulator includes a valve body disposed in the lower housing portion and is slidable among a plurality of operational positions. Typically, a valve disc is retained by the valve body. The valve disc is configured to engage a valve seat surrounding a fluid passageway when the valve body is in a closed position. When the valve disc and valve body are spaced from the valve seat, fluid passes through the passageway into a pressure chamber of the lower housing portion. A lever operatively couples the diaphragm with the valve body. When the input pressure pushes the valve disc and valve body away from the valve seat to allow fluid to pass through the passageway, pressure in the pressure chamber increases, and the diaphragm rises. As the diaphragm rises, the lever pivots about a pivot point and urges the valve body and valve disc back toward the valve seat. This reduces the amount of fluid that passes through the passageway and reduces the pressure in the pressure chamber. This back and forth action results in pressure regulation by regulating fluid flow through the passageway, around the valve body, and into the pressure chamber.

In a gas pressure regulator, an integral dielectric connection may be provided to electrically isolate an inlet piping from an outlet piping. When this occurs, it eliminates the need for additional components such as an electrically isolating union and the associated additional leak points. The electrical isolation prevents the galvanic corrosion associated with buried metallic piping connected to piping of dissimilar metals in a dwelling. The electrical isolation provides a degree of safety in the event that buried piping contacts underground electrical conductors by electrically isolating piping that enters a dwelling.

In some constructions, the dielectric connection may include a metallic insert and a polymer over-molded onto the metallic insert. Over-molding a bonded polymer onto a metallic insert can produce a component with a desirable combination of mechanical strength and electrical properties. However, there are substantial differences between individual injection molded polymeric components and composite construction consisting of an over-molded polymeric material bonded to a metallic insert. These differences provide distinct advantages and substantial benefits to the present invention.

When over-molding a metal insert with a bonded polymer, the types and grades of polymers, and therefore the range of mechanical and electrical performance characteristics, is limited to those that are compatible with, and capable of, adhering to the insert material. Components that are not over-molded are not subject to such material limitations.

The process of over-molding a metal insert with a bonded polymer introduces numerous manufacturing variables that can lead to defects and functional failures. These failures can include delamination of the polymer from the insert due to improper insert handling or preparation, reduced electrical insulating capability or structural failures including fluid leakage or failure to contain pressure due to defects in the over-molded polymer such as porosity and pin-holes caused by out-gassing of the insert during molding, variation in polymer thickness due to variation in both location of the insert within the over-molding tool and the tolerances associated with manufacturing metallic inserts. Polymeric components that are not over-molded on metallic inserts are not subject to these defects and failure modes.

The cost of over-molding a metallic insert with a bonded polymer can be relatively high due to the increased time required to cool the insert to the solidification temperature of the polymer during molding. Since the cooling time required for over-molding polymers is dependent on the thickness of the assembly being molded, and since cooling time can be in the range of 20 to 40 seconds for each 0.100 of an inch in thickness, it can take in excess of 100 seconds to over-mold a 0.050 inch thick polymer on both sides of a 0.250 inch thick insert. Since the cooling time for a 0.050 inch thick polymeric part that is not over-molded would be in the range of 10 to 20 seconds, it can be manufactured at substantially lower cost.

A metal insert that is over-molded with a bonded insulating polymer has the disadvantage of not being serviceable in the field. The entire over-molded assembly must be replaced which can make maintenance and repairs more complicated and expensive. Construction that is not over-molded allows the field replacement of individual insulating components in the event of damage or wear.

In addition, without some time of reinforcement, the over-molded insulating polymer may relax and loose its sealing to the metallic insert over time. Also, without some type of load distribution on the over-molded insulating polymer, a concentrated force under mechanical load may cause deflection of the over-molded insulating polymer, leading to leaks at the connection with the metallic insert. Further, without a drip line, the over-molded insulating polymer on the metallic insert may allow water to enter that could defeat the dielectric function.

Therefore, it is desirable to provide a pressure regulator with a new dielectric construction that electrically isolates an inlet piping from an outlet piping. It is also desirable to provide a new dielectric construction with individual injection molded polymeric components.

SUMMARY OF THE INVENTION

Accordingly, the present invention provides a dielectric fitting for a pressure regulator including a flange adapted to be disposed next to a housing of the pressure regulator, an isolator plate disposed next to the flange and adapted to be disposed between the flange and the housing, and an isolator cover disposed between the flange and the isolator plate to electrically isolate the flange from the housing.

The present invention also provides a pressure regulator including a housing having upper and lower housing portions defining an inlet and an outlet, the housing defining a passageway in communication with one of the inlet and the outlet. The pressure regulator also includes a diaphragm captured between the upper housing portion and the lower housing portion to define upper and lower pressure chambers and a valve body disposed in the passageway and movable between a plurality of operational positions. The pressure regulator further includes a dielectric fitting disposed next to a connection portion of the lower housing portion for one of the inlet and the outlet. The dielectric fitting includes a flange, an isolator plate disposed between the flange and the connection portion, and an isolator cover disposed between the flange and the isolator plate to electrically isolate the flange from the lower housing portion.

One advantage of the present invention is that a new dielectric fitting is provided for a pressure regulator to electrically isolate a flange from a body or housing of the pressure regulator. Another advantage of the present invention is that the dielectric fitting includes blind tapped holes on the body or housing of the pressure regulator that prevent water from entering that could defeat the dielectric function when installed as intended. Yet another advantage of the present invention is that the dielectric fitting includes a drip-lip feature on an isolator cover that prevents wicking between the isolator cover and the flange. Still another advantage of the present invention is that the dielectric fitting includes an intentional interference between an isolator plate and the isolator cover that prevents water entry that could defeat the dielectric function. A further advantage of the present invention is that the dielectric fitting includes a metallic reinforcement plate that distributes clamping loads over a larger area of a polymeric isolator cover, reducing creep, set, and relaxation that may cause deflection under mechanical load leading to leaks at the flange connection. Yet a further advantage of the present invention is that the dielectric fitting includes a drip-lip feature on the reinforcement plate and the isolator plate that prevents water and condensation from collecting and entering. Still a further advantage of the present invention is that the dielectric fitting includes a distinctly colored flange that allows inspectors to readily identify pressure regulators with dielectric fittings installed.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 2C is a sectional view illustrating a structure to suspend a diaphragm in a housing of the pressure regulator of FIG. 2B.

DESCRIPTION OF THE PREFERRED EMBODIMENT(S)

Figure 1:
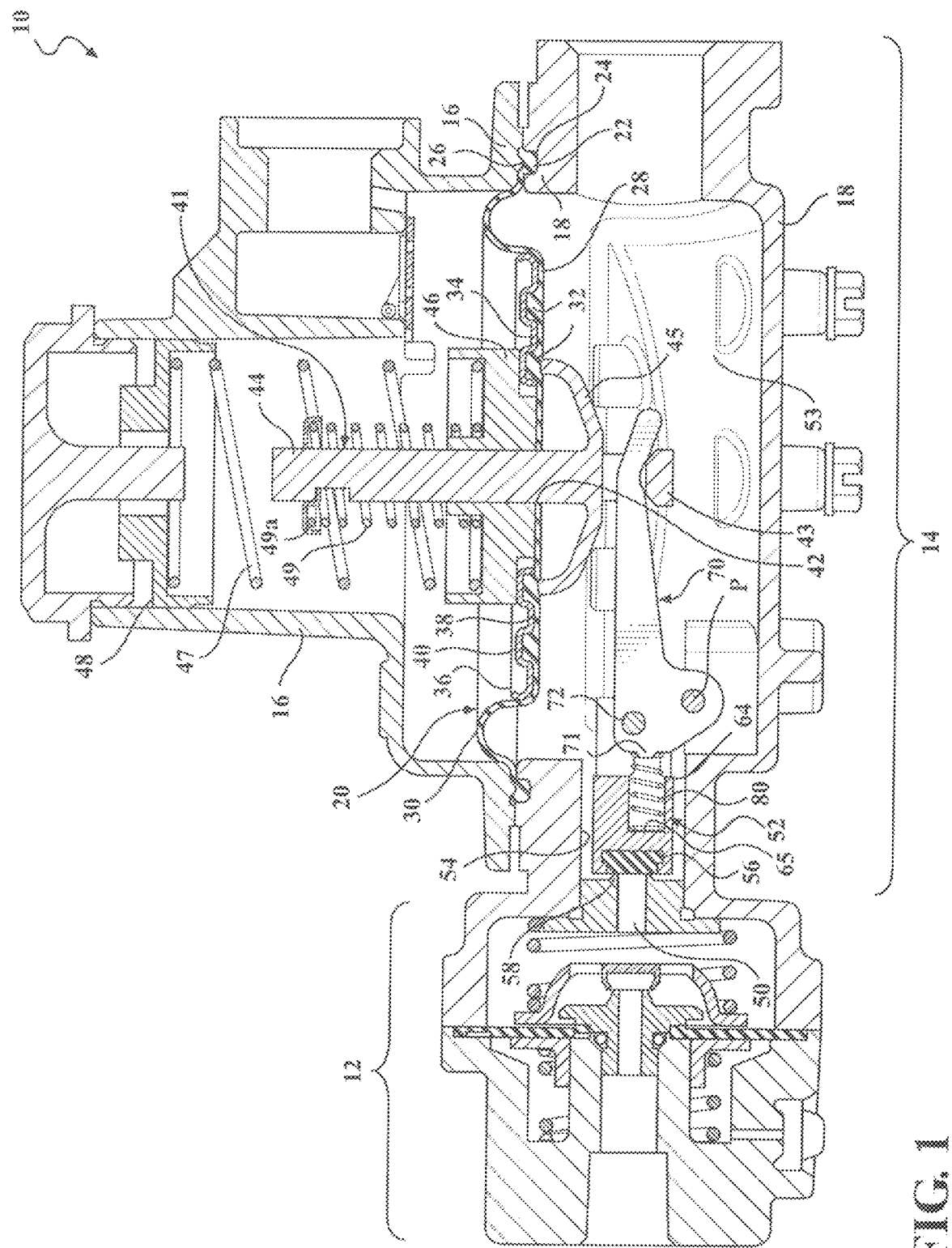
FIG. 1 is a sectional view of one embodiment of a pressure regulator.

Referring to the drawings and in particular FIG. 1, one embodiment of a pressure regulator 10 is shown. The pressure regulator 10 is configured to produce a desired output pressure of a fluid from an input pressure of the fluid. In the embodiment illustrated, the pressure regulator 10 is configured to reduce the input pressure so that the output pressure is substantially less than the input pressure.

In the embodiment illustrated, the pressure regulator 10 is a dual-stage pressure regulator having a first stage 12. Dual stage pressure regulators are sometimes employed for regulating the pressure of natural gas or propane in domestic fluid systems, although other uses are possible. In some embodiments, the first stage 12 reduces the pressure of fluid from a storage tank, such as a propane storage tank (not shown), to about 10 psi. Thus, about 10 psi is the input pressure for a second stage 14 of the pressure regulator 10. The second stage 14 is configured to reduce the input pressure from the first stage 12. In some embodiments, the second stage 14 reduces the approximately 10 psi input pressure to about 11 inches water column output pressure. Some regulations require the output pressure not to exceed 2 psi. It should be appreciated that the specific pressure set points of the pressure regulator 10 are not intended to limit the present invention.

The pressure regulator 10 includes a body or housing formed of an upper housing portion 16 and a lower housing portion 18 that are connected together with fasteners (not shown). The housing portions 16, 18 may be formed of metal. The pressure regulator 10 also includes a ring-shaped diaphragm, generally indicated at 20, having an outer periphery or lip 22 that is captured between the housing portions 16, 18. The lower housing portion 18 has an annular and U-shaped recess 24 sized and shaped to receive a bottom section of the outer lip 22. The upper housing portion 16 has an annular protrusion 26 configured to contact an upper surface of the outer lip 22. The protrusion 26 is formed as an arcuate and annular bump on a bottom surface of the upper housing portion 16. In some embodiments, the protrusion 26 is generally "V" shaped in cross-section.

The diaphragm 20 further includes an annular inner section 28 and a flexible connecting section 30 radially connecting the outer lip 22 and the annular inner section 28. In one embodiment, the flexible connecting section 30 is generally annular. The outer lip 22 has a first thickness and the flexible connecting section 30 has a second thickness less than the first thickness, making the flexible connecting section 30 flexible to allow raising and lowering of the annular inner section 28 within the housing. The annular inner section 28 has at least one, preferably a plurality of locating features formed in an upper surface thereof. The locating features shown in FIGS. 1 and 2 include alternating annular ridges 32 and grooves 34. In the embodiment illustrated, two ridges 32 and two grooves 34 are shown. The diaphragm 20 is made of a flexible material. The diaphragm 20 is integral, unitary, and one-piece.

The pressure regulator 10 includes a ring-shaped diaphragm plate 36 engaging the diaphragm 20. The diaphragm plate 36 is preferably formed as a separate rigid piece configured to be seated on the diaphragm 20 without being rigidly connected to the diaphragm 20. In some embodiments, however, the diaphragm plate 36 may be rigidly connected to the diaphragm 20. The diaphragm plate 36 is formed with at least one, preferably a plurality of locating features (in some cases stamped in the plate 36 when the plate 36 is metal or molded into the plate 36 when the plate 36 is plastic). The locating features of the diaphragm plate 36 are shaped to co-locate with the locating features of the diaphragm 20 to radially lock the diaphragm plate 36 to the diaphragm 20. In the embodiment illustrated, the locating features of the diaphragm plate 36 include alternating ridges 38 and grooves 40 shaped to mate with the grooves 34 and ridges 32 of the annular inner section 28, respectively, of the diaphragm 20. It should be appreciated that, when aligned to one another, the diaphragm plate 36 substantially covers an upper surface of the annular inner section 28 of the diaphragm 20. It should also be appreciated that the locating features prevent shifting of the diaphragm plate 36 laterally or radially relative to the diaphragm 20.

The pressure regulator 10 also includes a relief valve, generally indicated at 41. The diaphragm 20 and diaphragm plate 36 define a central bore 42 to receive the relief valve 41. The relief valve 41 includes a yoke 43 and a shaft or stem 44 extending axially from the yoke 43. The central bore 43 receives the stem 44 of the yoke 43. The relief valve 41 also includes a head 45 having an outer periphery sized to extend beyond the diameter of the central bore 43 and contact a bottom surface of the annular inner section 28. This contact seals against fluid flow between the head 44 and the annular inner section 28 under certain conditions. The pressure regulator 10 includes a spring retainer 46 disposed about the stem 44. The stem 44 is slidably received in the spring retainer 46. The pressure regulator 10 also includes a regulator spring 47 and a relief spring 49 disposed about the stem 44 and contacting the spring retainer 46, which supports the regulator spring 47 and the relief spring 49. The pressure regulator 10 further includes a relief spring retainer 49*a* disposed about the stem 44 and contacting the other end of the relief spring 49. It should be appreciated that, as pressure increases in a lower pressure chamber 53, separation may occur between the head 45 and the annular inner section 28 to relieve pressure in the lower pressure chamber 53, which is conventional in the art.

The pressure regulator 10 also includes a valve body, generally indicated at 52, located in a passageway 54 defined in the lower housing portion 18 that leads from an inlet 50 to a lower pressure chamber 53 defined in the housing. The valve body 52 is slidable in the passageway 54 among a plurality of operational positions. The pressure regulator 10 further includes a disc-shaped valve 56 carried by the valve body 52. The valve 56 is fixed to the valve body 52 to move with the valve body 52. The pressure regulator 10 also includes a valve seat 58 shaped for engagement by the valve 56 when the valve 56 is in a closed position thereby preventing the flow of fluid from the inlet 50 to the passageway 54. When the valve 56 and valve body 52 are spaced from the valve seat 58, fluid is allowed to flow from the inlet 50 through the passageway 54 and into the lower pressure chamber 46. The valve body 52 is formed of metal, but may be formed of other materials.

Referring to FIGS. 3-8, the valve body 52 includes a plurality of radially-extending spacers 60 that centrally align the valve body 52 in the passageway 54. The spacers 60 are spaced circumferentially and also provide pathways in the passageway 54 between the valve body 52 and the lower housing portion 18 through which the fluid can move from the inlet 50 to the lower pressure chamber 46. The valve body 52 also includes a pair of retainer tangs 62 that hold the valve 56 in position. The valve body 52 further includes an elongated spring pocket 64 defined therein having an inner surface 65.

The pressure regulator 10 also includes a lever, generally indicated at 70, pivotally supported about pivot axis P in the lower housing portion 18. The lever 70 has a projection 71 at one end and the other end of the lever 70 is captured in the yoke 43 so that as the yoke 43 rises, the end of the lever 70 also rises. The pressure regulator 10 includes a driving pin 72 fixed to the lever 70 at a second end of the lever 70.

The driving pin 72 is sized to fit within a recess 74 defined in the valve body 52. The valve body 52 includes a surface 73 that defines the recess 74 and an elongated slot 76. The lever 70 has a thickness sized to fit within the slot 76 in the valve body 52 for movement in the slot 76. When the lever 70 pivots counterclockwise about pivot axis P, such as when the diaphragm 20 and yoke 41 are rising in the housing formed by the upper and lower housing portions 16, 18, the driving pin 72 contacts the surface 73 defining the recess 74 to urge the valve body 52 toward the valve seat 58. When pressure on the valve 56 pushes the valve body 52 away from the valve seat 58, the surface 71 presses against the driving pin 72 to pivot the lever 70 clockwise.

The pressure regulator 10 also includes a vibration dampener assisting in preventing vibration and/or humming of the valve body 52 in the passageway 54. In the embodiment illustrated, the vibration dampener is a spring 80 located in the spring pocket 64. The spring 80 may be a compression spring. The spring 80 has one end that abuts the inner surface 65 of the valve body 52 and an opposing end engaged by the projection 71 on the lever 70. The spring pocket 64 is located offset from a central axis A (FIG. 6) of the valve body 52. In the embodiment illustrated, the entire spring pocket 64 is spaced radially from the axis A such that the axis A does not pass through any of the spring pocket 64. Owing to the driving pin 72 being non-fixedly located in the recess 74 and the offset location of the spring 80, the valve body 52 is pivoted about the driving pin 72 by the spring 80 to provide an off-axis force against the valve body 52. In particular, the force is applied transverse to the axis A. One component of this force is applied perpendicularly to the axis A. This perpendicular component of the force presses the spacers 60 of the valve body 52 against an outer surface of the passageway 54 to reduce vibration or humming of the valve body 52 in the passageway 54. Owing to tolerances of the passageway 54 to allow free sliding of the valve body 52 in the passageway 54, there may be gaps between radially outer surfaces of the spacers 60 and the inner surface forming the passageway 54, which can result in vibration or humming of the valve body 52 in the passageway 54 when fluid under pressure is flowing around the valve body 52. The perpendicular component of force presses the valve body 52 to reduce this vibration or humming.

Figure 2A:
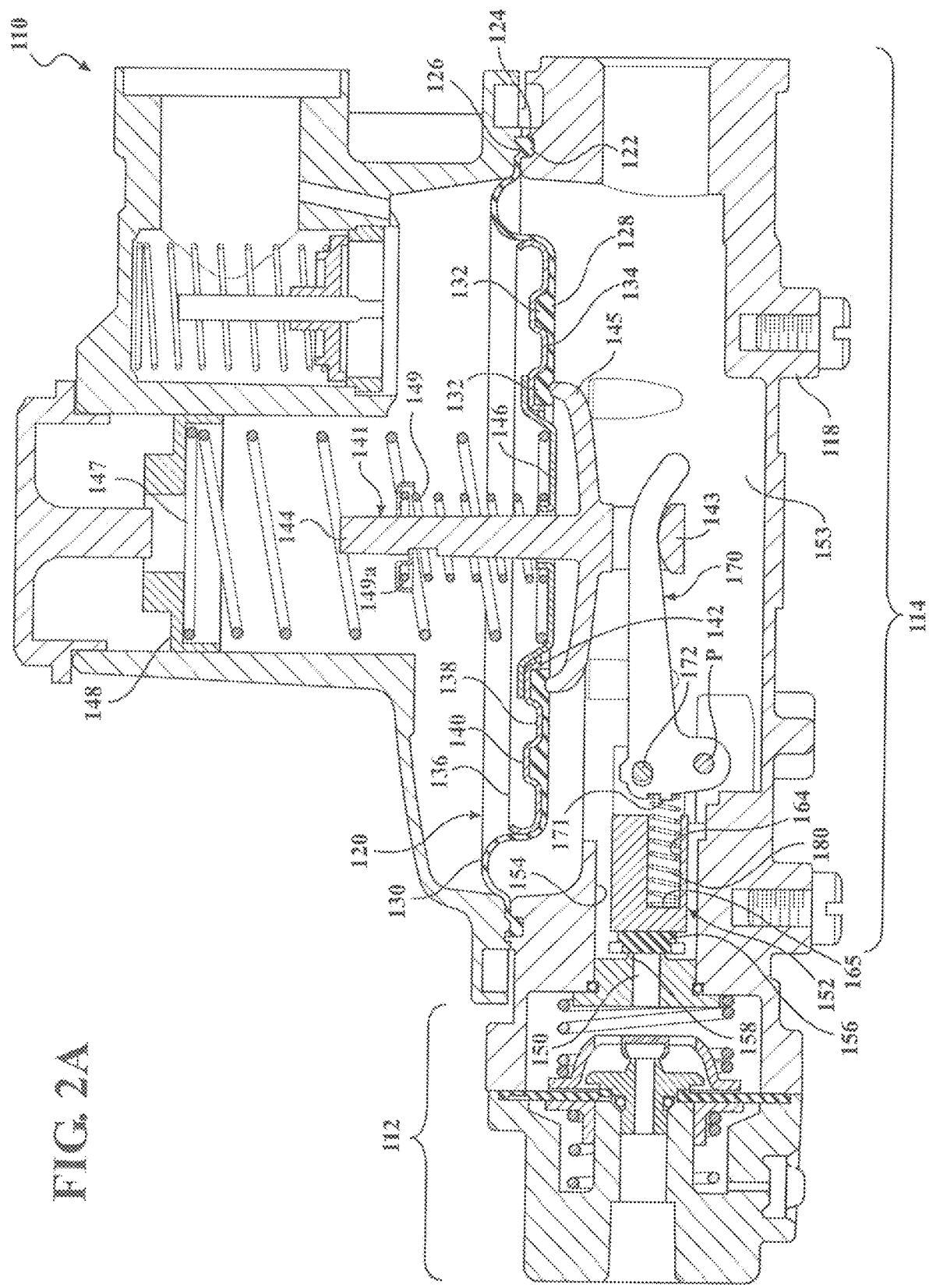
FIG. 2A is a sectional view of another embodiment of the pressure regulator of FIG. 1.
Figure 2B:
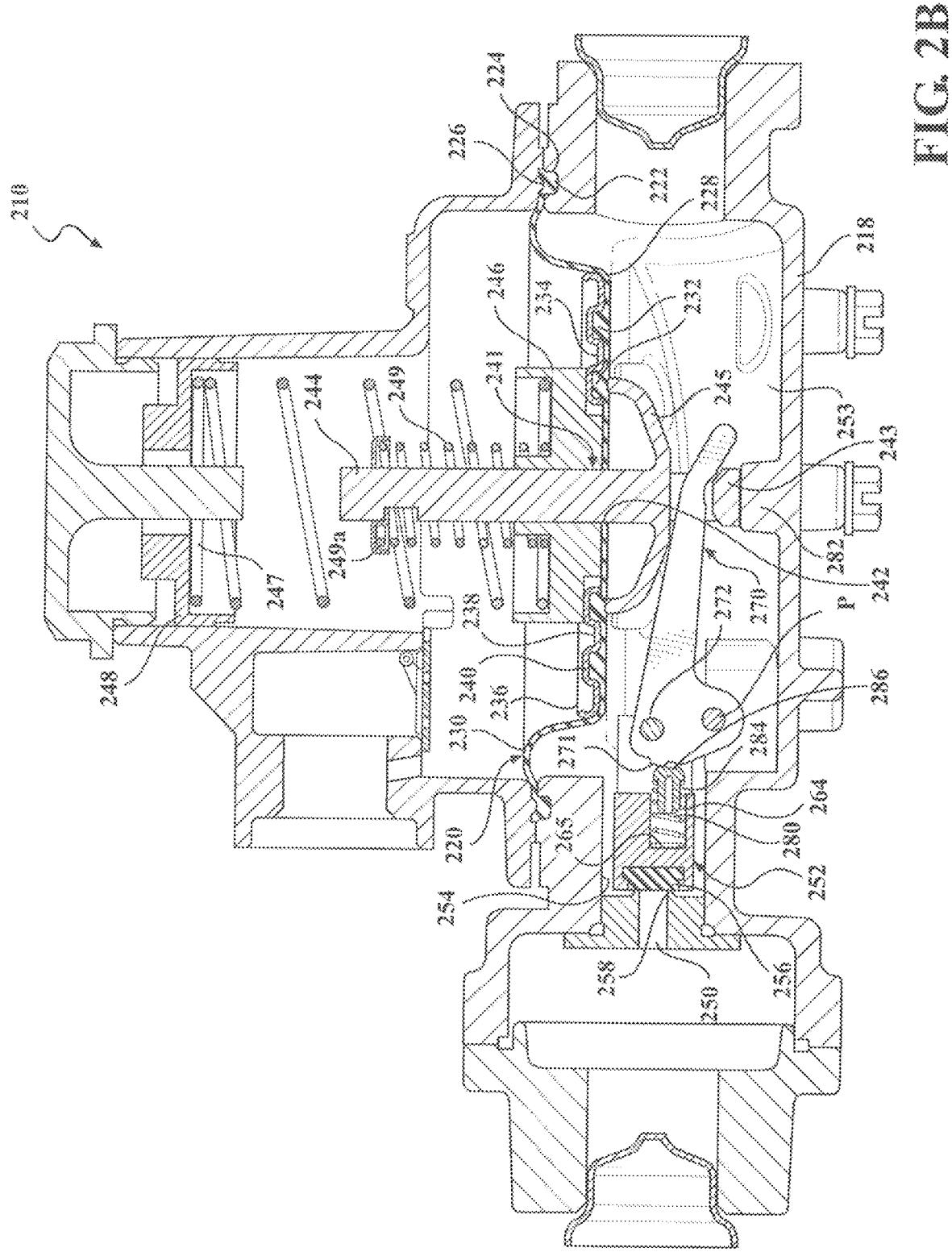
FIG. 2B is a sectional view of yet another embodiment of the pressure regulator of FIG. 1.
Figure 3:
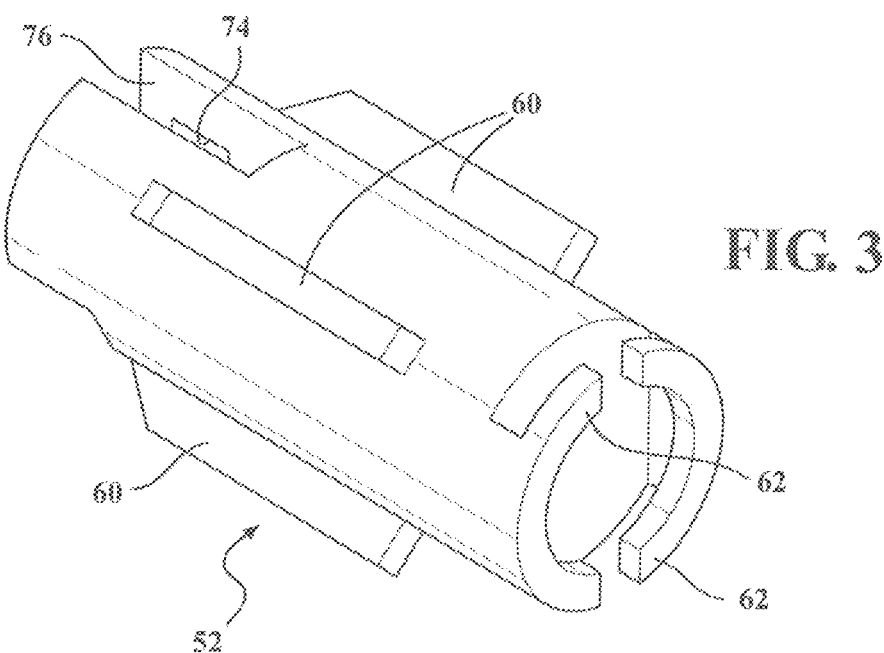
FIG. 3 is a perspective view of a valve body of the pressure regulators of FIGS. 1 through 2B.
Figure 4:
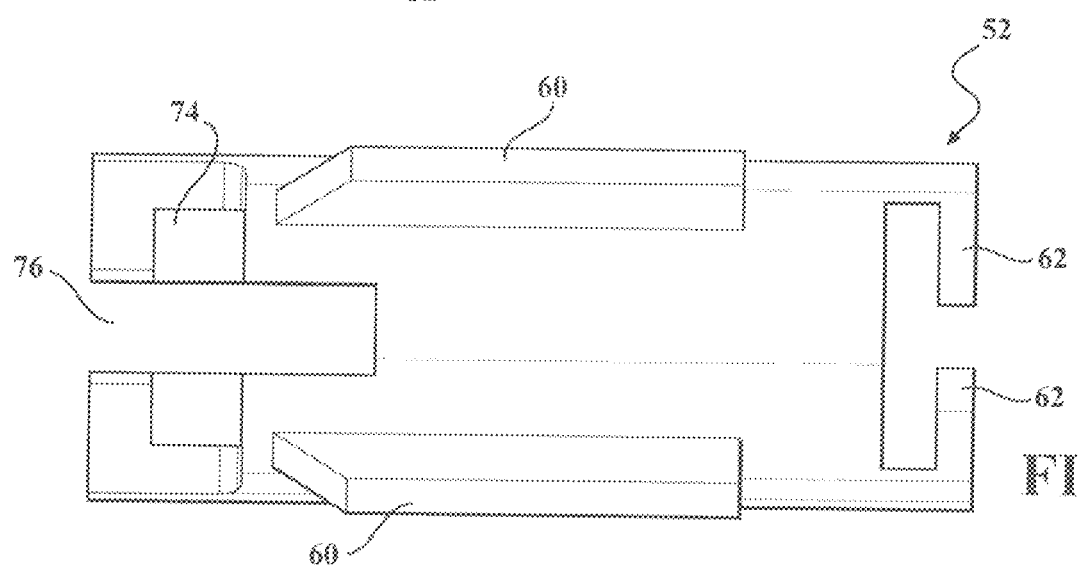
FIG. 4 is a bottom view of the valve body of FIG. 3.
Figure 5:
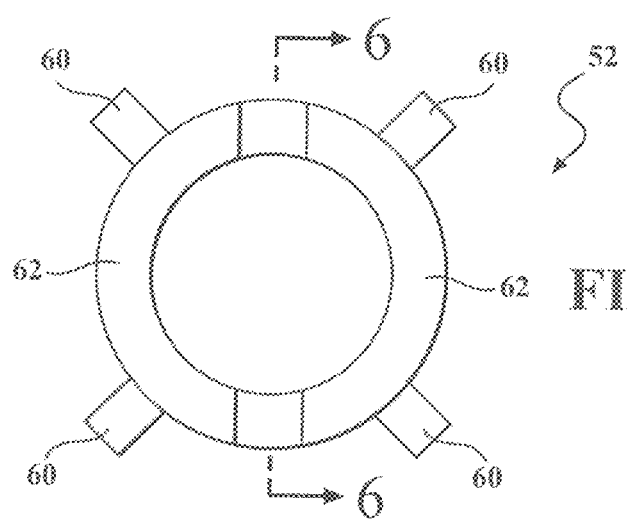
FIG. 5 is a front view of the valve body of FIG. 3.
Figure 6:
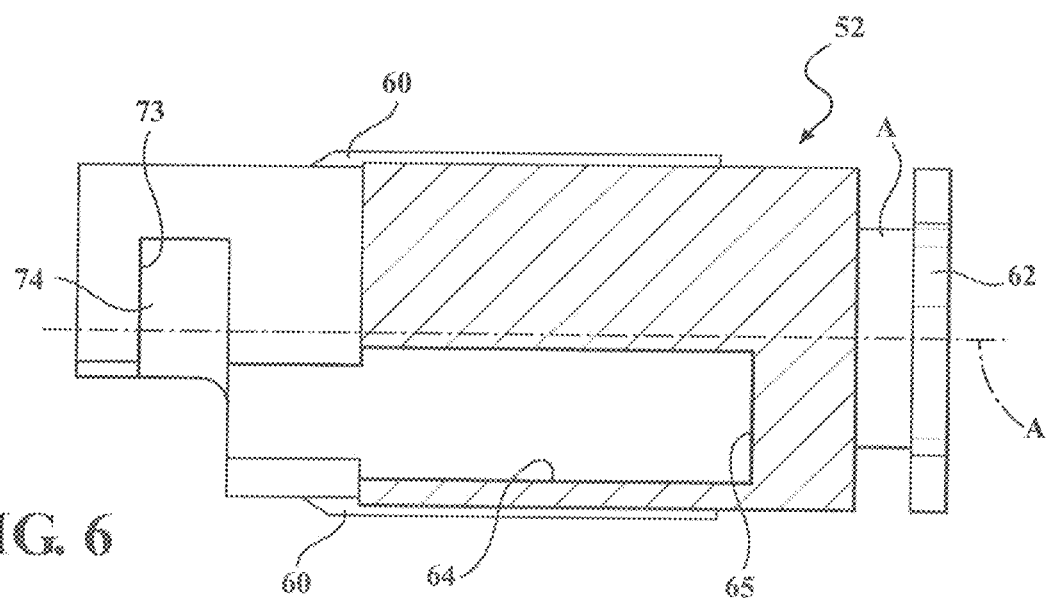
FIG. 6 is a sectional view taken along line 6-6 of FIG. 5.
Figure 7:
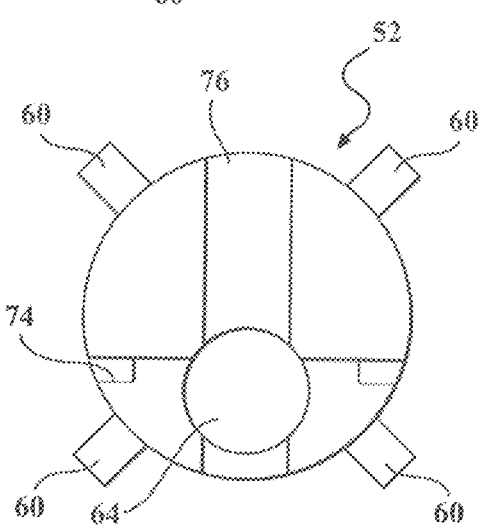
FIG. 7 is a rear view of the valve body of FIG. 3.
Figure 8:
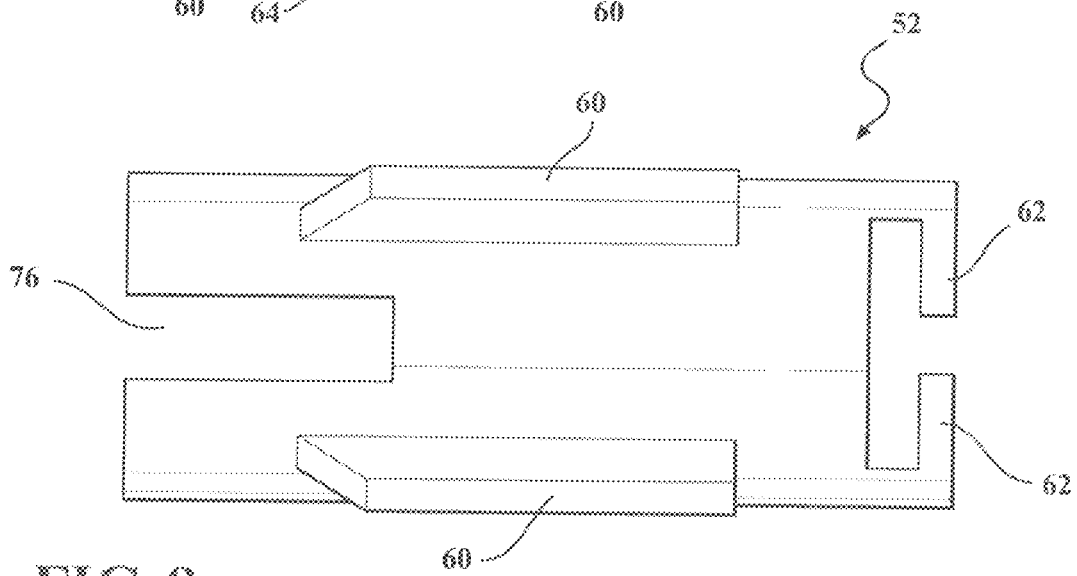
FIG. 8 is a top view of the valve body of FIG. 3.
Figure 9:
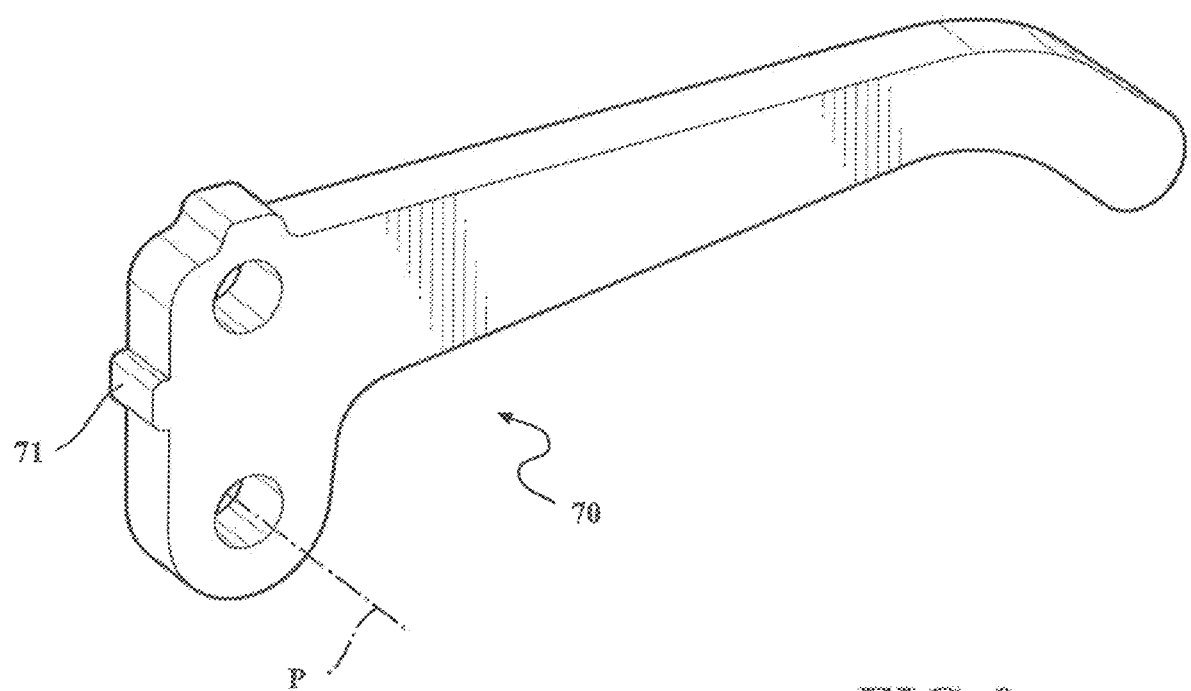
FIG. 9 is a perspective view of a lever of the pressure regulators of FIGS. 1 through 2B.

Alternative embodiments 110, 210, 310 of the pressure regulator 10 are shown in FIGS. 2A through 2C. In FIG. 2A, numerals are increased by 100 to refer to the same or similar parts described above for the pressure regulator 10. For instance, the diaphragm 20 in FIG. 1 is referenced as diaphragm 120 in FIG. 2A. In FIG. 2B, numerals are increased by 200 to refer to the same or similar parts described above for the pressure regulator 10. For instance, the diaphragm 20 in FIG. 1 is the diaphragm 220 in FIG. 2B. In FIG. 2C, numerals are increased by 300 to refer to the same or similar parts described above for the pressure regulator 10. For instance, the diaphragm 20 in FIG. 1 is the diaphragm 320 in FIG. 2C. It should be appreciated that any features shown in the embodiments of FIGS. 2A, 2B, 2C can be combined with the other features described above with reference to FIG. 1.

Referring to FIG. 2B, the pressure regulator 210 includes a support 282 (also referred to as a boss) is integrally formed with the lower housing portion 218. As shown, the support 282 contacts a bottom surface of the yoke 243 when the pressure regulator 210 is at rest, i.e., before any fluid enters through the inlet 250. The regulator spring 247 is set to control the output pressure by a threaded spring adjuster 248 (basically threads and unthreads to set spring compression).

At rest, the regulator spring 247 pushes the yoke 243 against the support 282. The outer periphery of the head 245, by virtue of contact with the annular inner section 228 of the diaphragm 220, and the yoke 243 by contacting the support 282 prevents the annular inner section 228 from contacting the support 282 or any other portion of the housing. At rest, as shown in FIG. 2B, the diaphragm 220 only contacts the housing at the outer lip 222. The annular inner section 228 and the flexible connecting section 230 are suspended in the housing without any direct contact with the housing. It should be appreciated that this prevents premature abrasion or wear of the diaphragm 220 associated with rubbing against the housing and readies the diaphragm 220 for use.

In FIG. 2B, an alternative arrangement of the vibration dampener is shown. In FIG. 2B, the pressure regulator 210 includes a plunger 284 having a first end positioned inside the spring 280 located in spring pocket 264. The spring 280 has one end that abuts the inner surface 265 of the valve body 252. The plunger 284 has a head 286 and an opposing end of the spring 280 is engaged by the head 286 of the plunger 265. It should also be appreciated that the head 286 is engaged by the projection 271 on the lever 270.

Referring to FIG. 2C, the lower housing portion 318 defines a plurality of arcuate recesses that act as support surfaces 388 integrally formed with the lower housing portion 318. As shown, the support surfaces 388 contact a bottom surface of the head 345 of the relief valve 341 when the pressure regulator 310 is at rest, i.e., before any fluid enters through the inlet. The regulator spring 347 is set to control the output pressure by the threaded spring adjuster 348 (basically threads and unthreads to set spring compression). At rest, the regulator spring 347 pushes the head 345 against the support surfaces 388. The outer periphery of the head 345, by virtue of contact with the annular inner section 328, and by contacting the support surfaces 388 prevents the annular inner section 328 from contacting the any other portion of the housing. As shown in FIG. 2C, at rest, the diaphragm 320 only contacts the housing at the outer lip 322. The annular inner section 328 and the flexible connecting section 330 are suspended in the housing without any direct contact with the housing. It should be appreciated that this prevents premature abrasion or wear of the diaphragm 320 associated with rubbing against the housing and readies the diaphragm 320 for use.

Referring to FIGS. 10-16, still another embodiment, according to the present invention, of the pressure regulator 10 is shown. Like parts of the pressure regulator 10 have like reference numerals increased by four hundred (400). For instance, the upper housing portion 16 and the lower housing portion 18 in FIG. 1 are referenced as upper housing portion 416 and lower housing portion 418 in FIGS. 10 and 11. It should be appreciated that any features shown in the embodiments of FIGS. 10-16 can be combined with the other features described above with reference to FIGS. 1, 2A, 2B, and 2C.

The pressure regulator 410 is configured to produce a desired output pressure of a fluid from an input pressure of the fluid. In the embodiment illustrated, the pressure regulator 410 is configured to reduce the input pressure so that the output pressure is substantially less than the input pressure.

In the embodiment illustrated, the pressure regulator 410 is of a single-stage type having a stage 414. About 10 psi is the input pressure for the stage 414 of the pressure regulator 410. The stage 414 is configured to reduce the input pressure. In some embodiments, the stage 414 reduces the approximately 10 psi input pressure to about 11 inches water column output pressure. Some regulations require the output pressure not to exceed 2 psi. It should be appreciated that the specific pressure set points of the pressure regulator 410 are not intended to limit the present invention.

Figure 10:
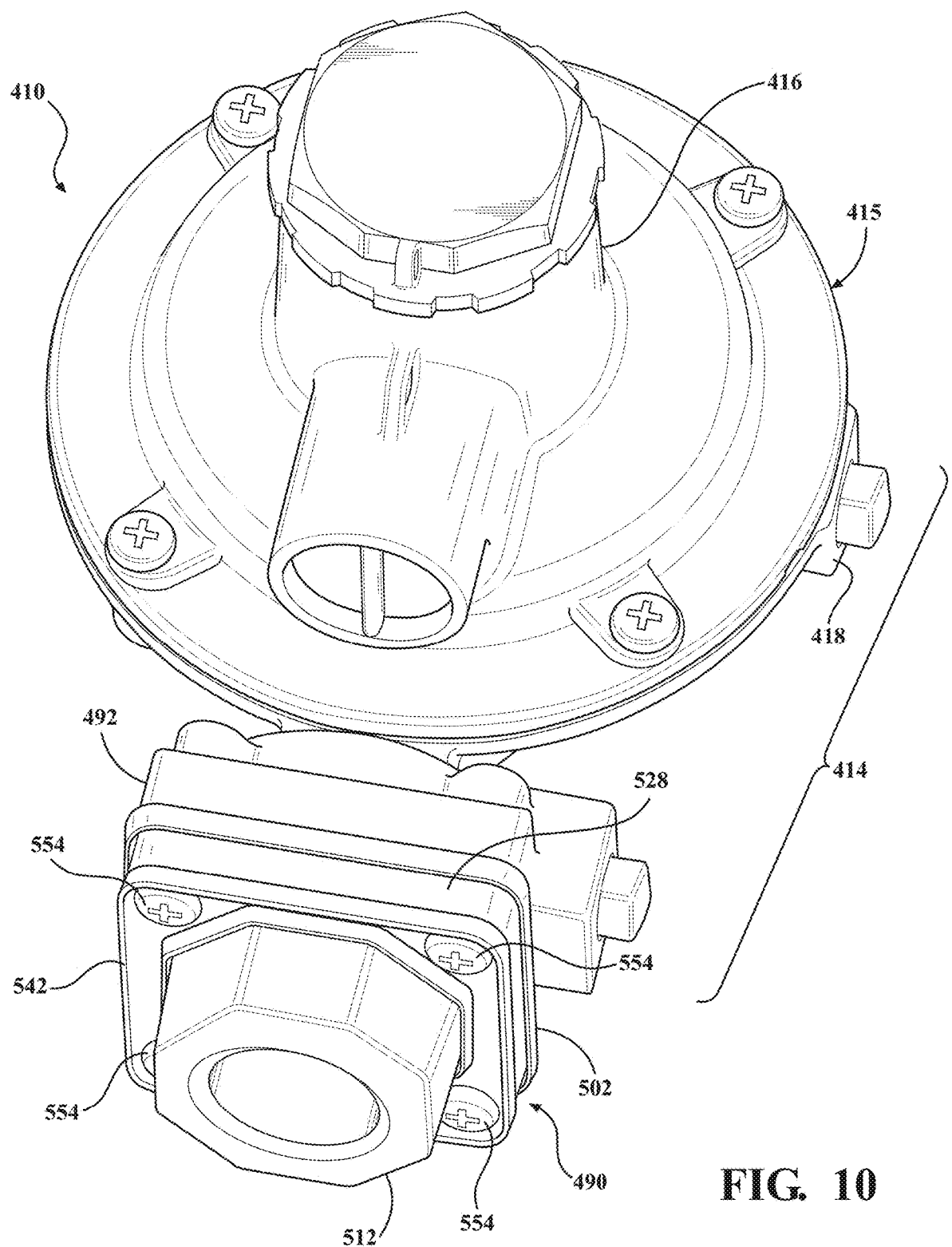
FIG. 10 is a perspective view of still another embodiment of the pressure regulator of FIG. 1 with a dielectric fitting, according to the present invention.
Figure 11:
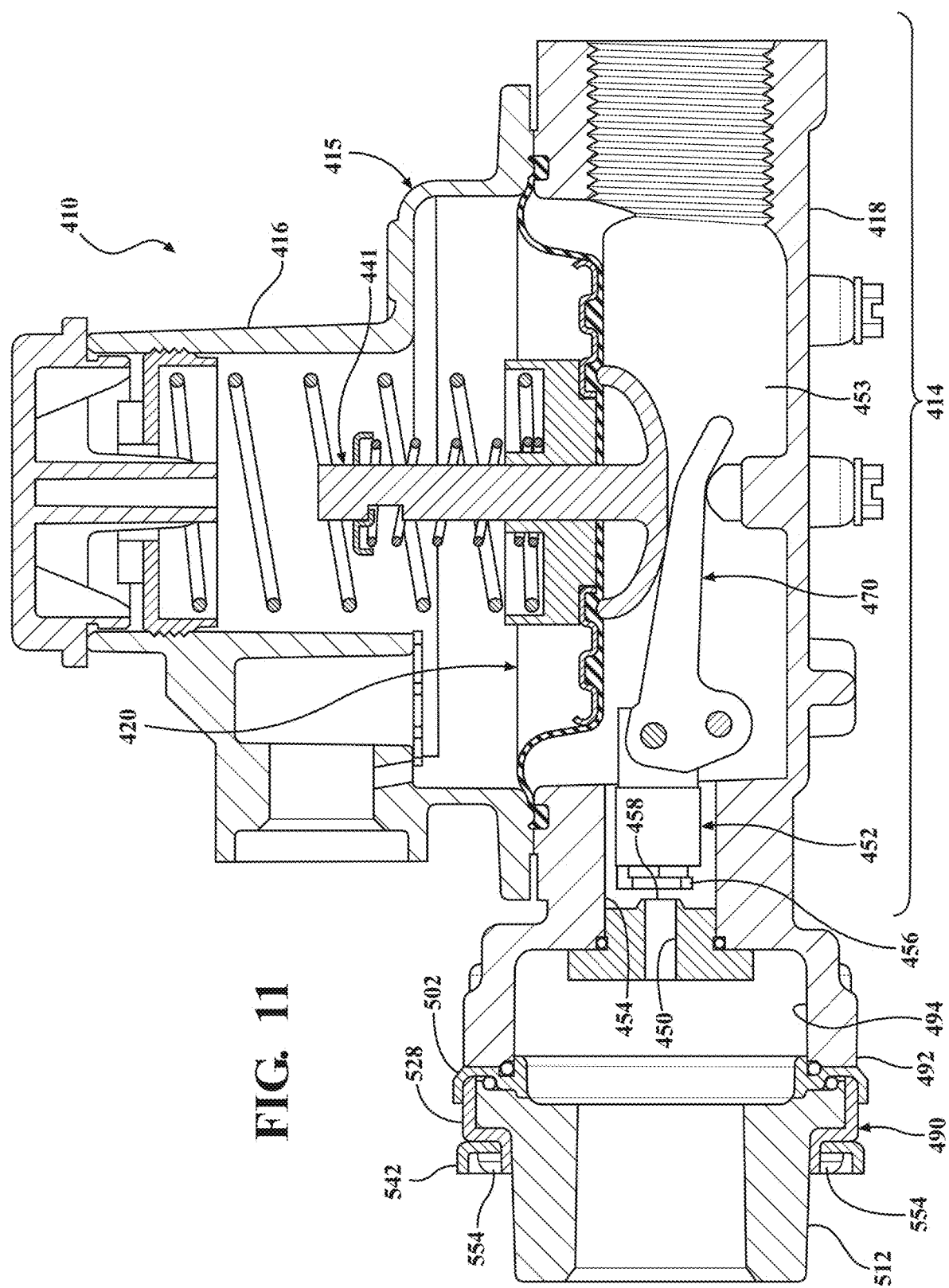
FIG. 11 is a sectional view of the pressure regulator with the dielectric fitting of FIG. 10.
Figure 12:
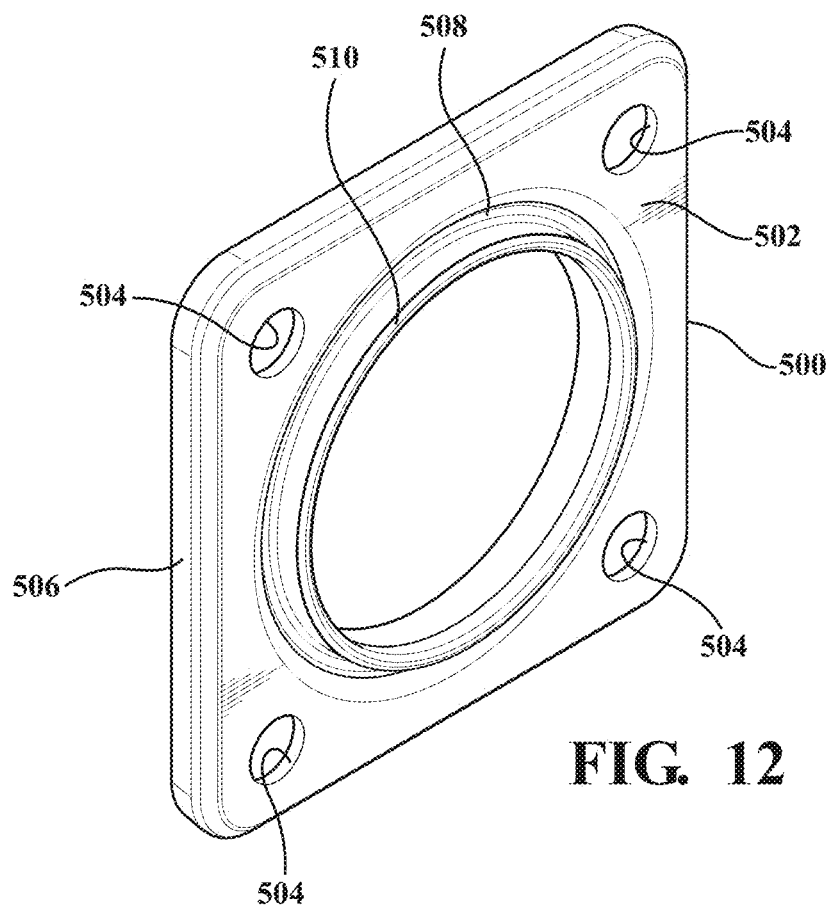
FIG. 12 is a perspective view of an isolator plate of the dielectric fitting of FIGS. 10 and 11.
Figure 13:
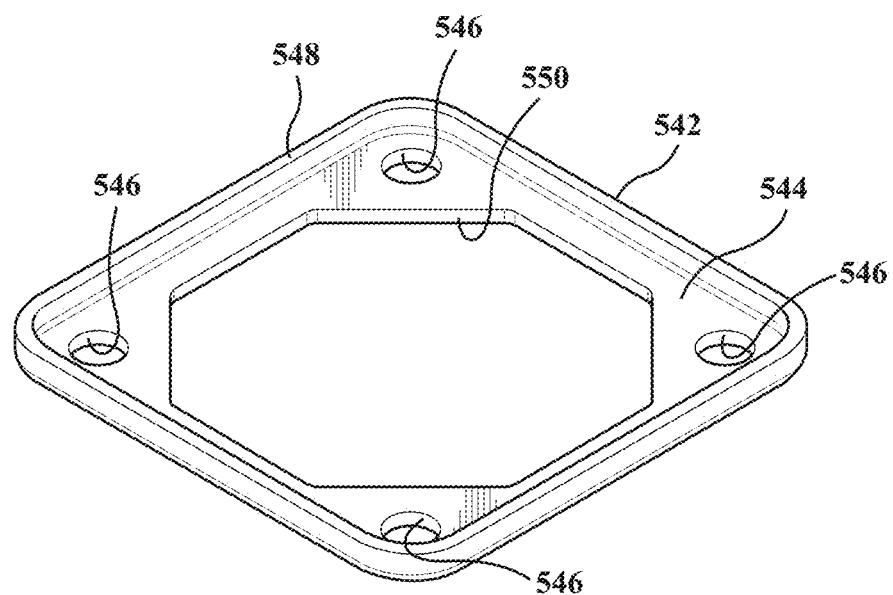
FIG. 13 is a perspective view of a reinforcement plate of the dielectric fitting of FIGS. 10 and 11.
Figure 14:
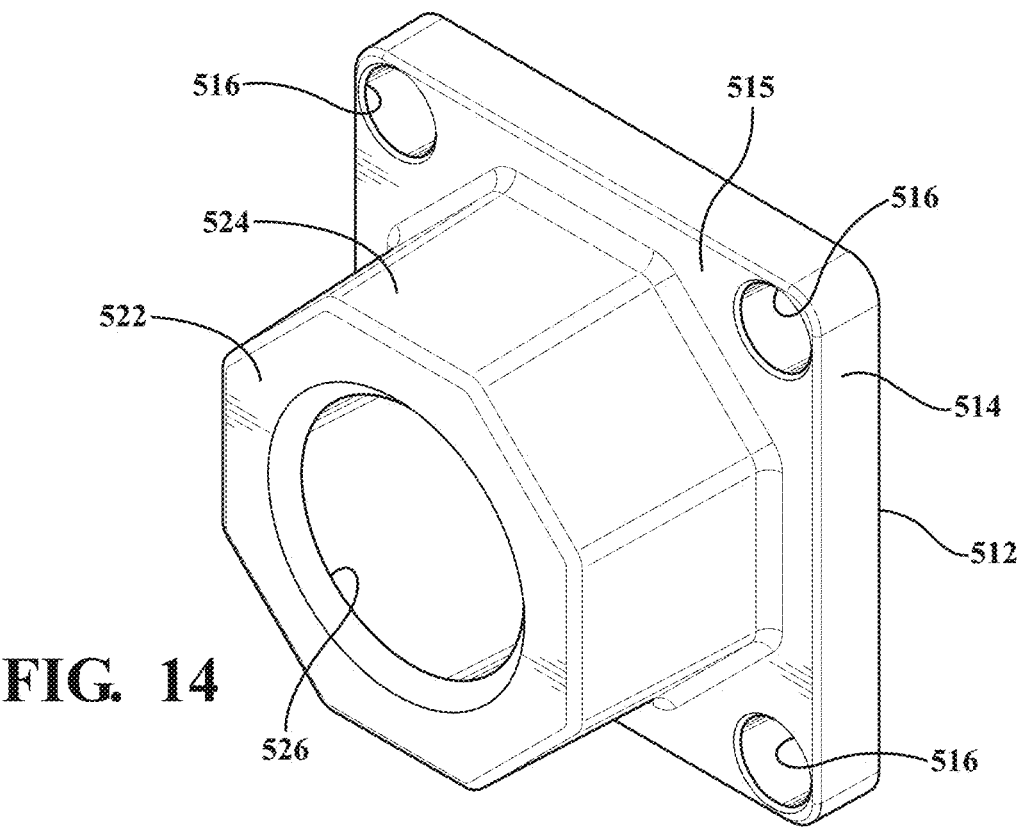
FIG. 14 is a perspective view of a flange of the dielectric fitting of FIGS. 10 and 11.
Figure 15:
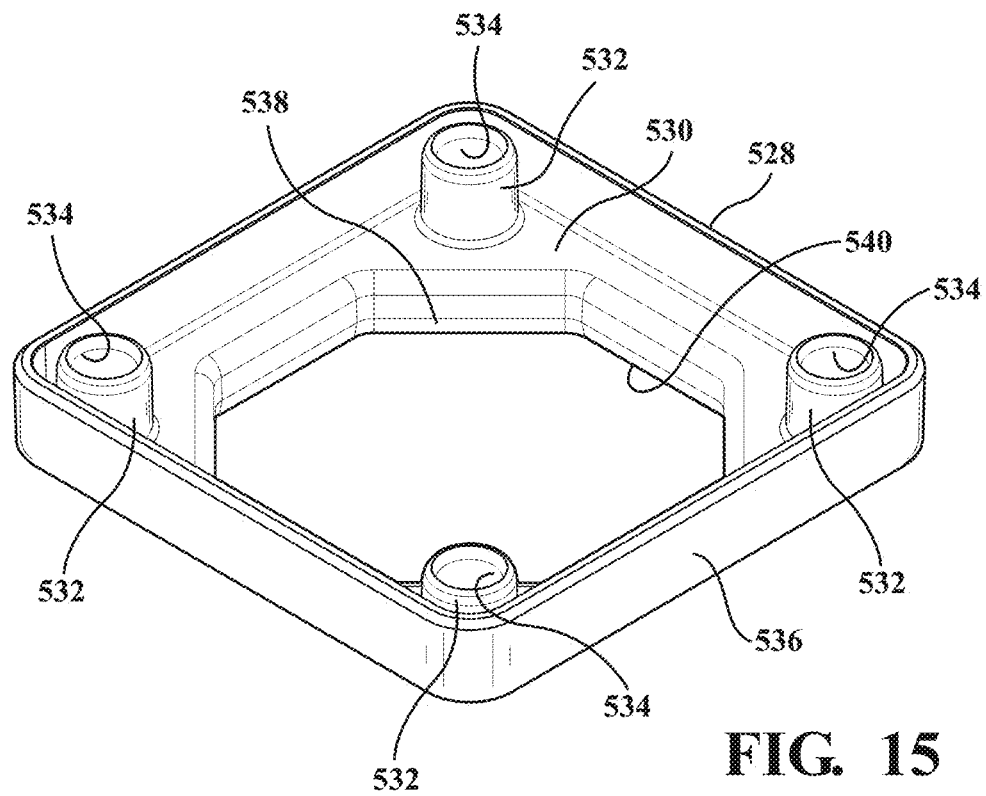
FIG. 15 is a perspective view of an isolator cover of the dielectric fitting of FIGS. 10 and 11.
Figure 16:
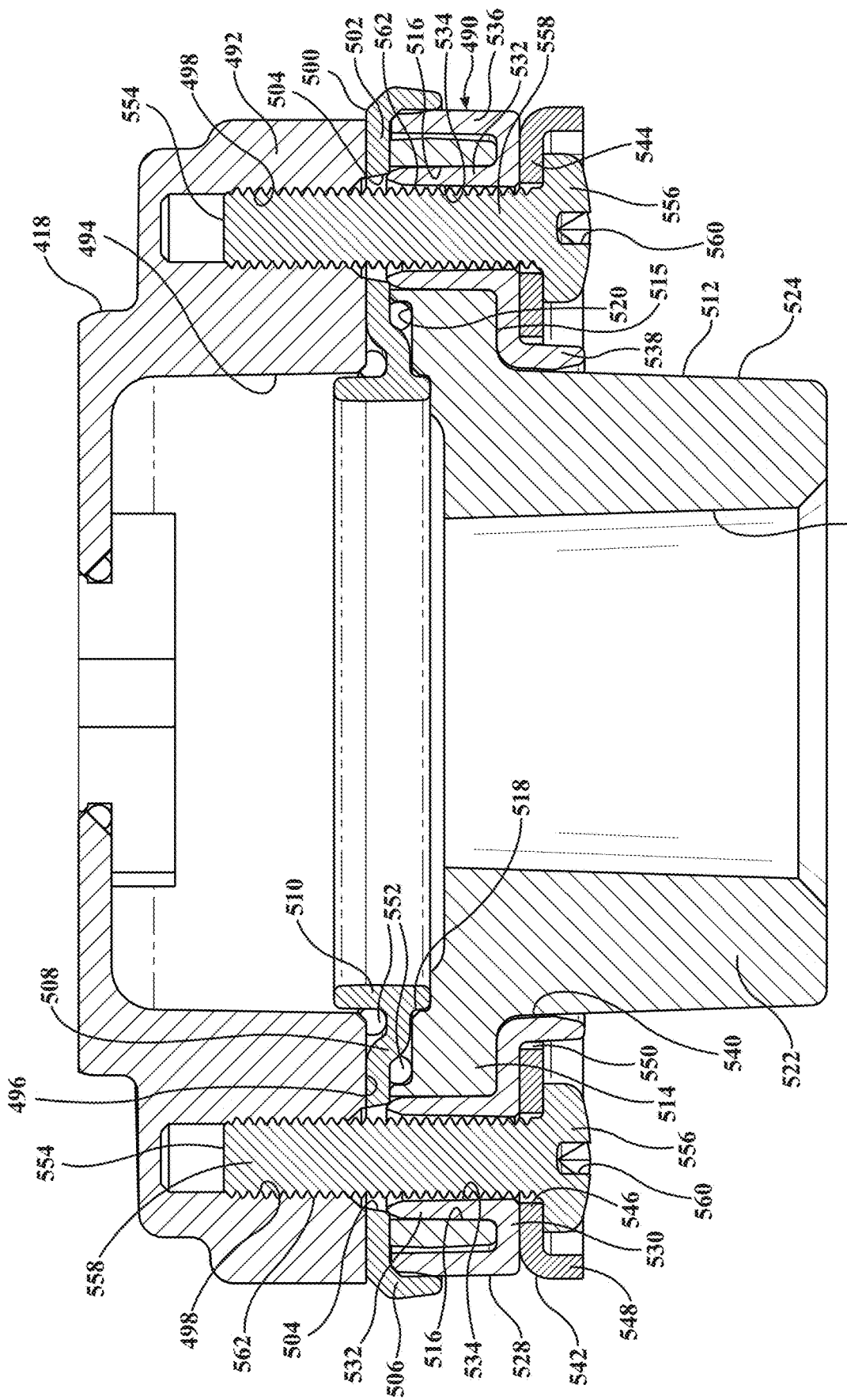
FIG. 16 is an enlarged view of the dielectric fitting and a connection portion of the pressure regulator of FIG. 11.

In the embodiment illustrated in FIGS. 10 and 11, the pressure regulator 410 includes a body or housing, generally indicated at 415, formed of an upper housing portion 416 and a lower housing portion 418 that are connected together with fasteners (not shown). The housing portions 416, 418 may be formed or constructed of a material with high thermal conductivity such as cast iron.

The pressure regulator 410 also includes a ring-shaped diaphragm, generally indicated at 420, captured between the housing portions 416, 418. The pressure regulator 410 includes a relief valve, generally indicated at 441, cooperating with the diaphragm 420 as previously described.

The pressure regulator 410 includes a valve body, generally indicated at 452, located in a passageway or orifice 454 defined in the lower housing portion 418 that leads from an inlet 450 to a lower pressure chamber 453 defined in the housing. The valve body 452 is slidable in the passageway 454 among a plurality of operational positions. The pressure regulator 410 further includes a disc-shaped valve 456 carried by the valve body 452. The valve 456 is fixed to the valve body 452 to move with the valve body 452. The pressure regulator 410 also includes a valve seat 458 shaped for engagement by the valve 456 when the valve 456 is in a closed position thereby preventing the flow of fluid from the inlet 450 to the passageway 454. When the valve 456 and valve body 452 are spaced from the valve seat 458, fluid is allowed to flow from the inlet 450 through the passageway 454 and into the lower pressure chamber 453.

The pressure regulator 410 also includes a lever, generally indicated at 470, pivotally supported about a pivot axis in the lower housing portion 418. The lever 470 cooperates with the valve body 452 and the relief valve 441 as previously described.

Referring to FIGS. 10 and 11, the pressure regulator 410 further includes a dielectric fitting, generally indicated at 490 and according to the present invention, disposed next to the lower housing portion 418. As illustrated in FIGS. 10-16, the dielectric fitting 490 is disposed next to a connection portion 492 of the lower housing portion 418. The connection portion 492 includes a fluid aperture 494 formed as a cavity and a connection surface 496 formed at an end of the fluid aperture 494. In one embodiment, the fluid aperture 494 is generally circular in shape and the connection surface 496 is generally planar, both of which may be any suitable shape. The connection portion 492 also includes at least one threaded aperture 498 formed as a blind tapped hole to allow the dielectric fitting 490 to be fastened to the connection portion 492 of the lower housing portion 418 and prevent water from entering that may defeat the dielectric function when installed as intended. In one embodiment, the connection portion 492 includes a plurality of the threaded apertures 498 extending axially therein, for example four (4). It should be appreciated that the dielectric fitting 490 is used to electrically isolate a flange 512 to be described from the lower housing portion 418 and may be used with any of the pressure regulators described above with reference to FIGS. 1, 2A, 2B, and 2C. It should also be appreciated that the connection portion 492 may be for either the inlet or the outlet of the lower housing portion 118.

As illustrated in FIGS. 10-16, the dielectric fitting 490 will now be described starting with reference numerals beginning with 500 that will not be like reference numerals increased by four hundred (400) for like parts of the pressure regulator 10. The dielectric fitting 490 includes an isolator plate 500 disposed next to or adjacent the connection portion 492 of the lower housing portion 418. In one embodiment, the isolator plate 500 is generally rectangular in shape, but may be any suitable shape, to be disposed next to the connection portion 492 of the lower housing portion 418. The isolator plate 500 includes a planar portion 502 to abut the connection surface 496 of the connection portion 492. The isolator plate 500 also includes at least one fastener through-aperture 504 extending axially through the planar portion 502. In one embodiment, the isolator plate 500 includes a plurality of the fastener through-apertures 504, for example four (4). The fastener through-apertures 504 are aligned with the threaded apertures 498 in the connection portion 492 of the lower housing portion 418. In one embodiment, the fastener through-apertures 504 are generally circular in shape, but may be any suitable shape, and may be tapered toward the threaded apertures 498. The isolator plate 500 includes an outer flange 506 extending along an outer perimeter or sides of the planar portion 502 and axially away from the connection surface 496 of the connection portion 492 of the lower housing portion 418. The outer flange 506 forms a drip lip that prevents water and condensation from collecting and entering the dielectric fitting 490. The isolator plate 500 also includes a seal retaining portion 508 extending radially from the planar portion 502 and axially away from the connection surface 496 of the connection portion 492 of the lower housing portion 418. In one embodiment, the seal retaining portion 508 has a generally concave to convex arcuate shape. The isolator plate 500 further includes an inner ring portion 510 extending axially from one end of the seal retaining portion 508 and circumferentially. In one embodiment, the inner ring portion 510 is generally circular in shape, but may be any suitable shape, to be partially disposed in the fluid aperture 494 of the connection portion 492 of the lower housing portion 418. The isolator plate 500 is made of a polymeric material and formed as an individual injection molded polymeric component. The isolator plate 500 is integral, unitary, and one-piece. It should be appreciated that the isolator plate 500 is a rigid member. It should also be appreciated that a portion of the inner ring portion 510 is disposed in the fluid aperture 494 of the connection portion 492 of the lower housing portion 418 to capture the inner ring portion 510 therein. It should also be appreciated that the isolator plate 500 is not adhered to the connection portion 492 of the lower housing portion 118.

The dielectric fitting 490 also includes a flange 512 disposed next or adjacent to the isolator plate 500. In one embodiment, the flange 512 includes a base portion 514 at one end. In one embodiment, the base portion 514 is generally rectangular in shape, but may be any suitable shape, to be disposed next to the isolator plate 500 and the connection portion 492 of the lower housing portion 418. The base portion 514 has a generally planar top surface 515. The flange 512 also includes at least one fastener through-aperture 516 extending axially through the base portion 514. In one embodiment, the base portion 514 includes a plurality of the fastener through-apertures 516, for example four (4). The fastener through-apertures 516 are aligned with the fastener through-apertures 504 in the isolator plate 500 and the threaded apertures 498 in the connection portion 492 of the lower housing portion 418. In one embodiment, the fastener through-apertures 516 are generally circular in shape, but may be any suitable shape. The base portion 514 further includes a first ledge 518 formed as a step and spaced radially inward from the fastener through-apertures 516 to allow a portion of the inner ring portion 510 of the isolator plate 500 to be partially disposed or captured therein. The base portion 514 also includes a second ledge 520 formed as a step and spaced radially between the first ledge 518 and the fastener through-apertures 516 to allow a seal 552 to be described to be disposed or captured therein. In one embodiment, the flange 512 is distinctly colored, for example yellow, with a substance such as paint that allows inspectors to readily identify pressure regulators with dielectric fittings 490 installed. It should be appreciated that a portion of the inner ring portion 510 is disposed in the base portion 514 of the flange 512 to couple or capture the inner ring portion 510 therein.

The flange 512 also includes a fluid connector portion 522 extending radially from the base portion 514. In one embodiment, the fluid connector portion 522 is generally cylindrical in shape, but may be any suitable shape. The fluid connector portion 552 has an outer surface 524 that is generally octagonal in shape, but may be any suitable shape. The fluid connector portion 522 further includes a passageway 526 extending axially therethrough to allow fluid to flow through the dielectric fitting 490. In one embodiment, the passageway 526 is generally circular in shape, but may have any suitable shape. In one embodiment, the passageway 526 is generally tapered inwardly from one end toward the isolator plate 500. The flange 512 is made of a metal or metallic material such as steel. The flange 512 is integral, unitary, and one-piece. It should be appreciated that the flange 512 is connected to piping (not shown) and may be applied to the connection portion 492 of the lower housing portion 418 for either the inlet or the outlet of the pressure regulator 410.

The dielectric fitting 490 also includes an isolator cover 528 disposed next to the flange 512 and the isolator plate 500. In one embodiment, the isolator cover 528 is generally rectangular in shape, but may be any suitable shape, to be disposed next to the flange 512 and the isolator plate 500. The isolator cover 528 includes a planar portion 530 to abut the corresponding planar top surface 515 of the base portion 514 of the flange 512. The isolator cover 528 also includes at least one fastener portion 532 extending axially from the planar portion 530. In one embodiment, the isolator cover 528 includes a plurality of the fastener portions 532, for example four (4). The fastener portions 532 are aligned with the fastener through-apertures 516 in the base portion 514 of the flange 512. In one embodiment, the fastener portions 532 are generally cylindrical and circular in shape, but may be any suitable shape, to be disposed within the fastener through-apertures 516 in the base portion 514 of the flange 512. Each of the fastener portions 532 form a fastener through-aperture 534. In one embodiment, the fastener through-aperture 534 is generally circular in shape, but may be any suitable shape. The isolator cover 528 also includes an outer flange 536 extending along an outer perimeter or sides thereof and axially away from the planar portion 530 and toward the isolator plate 500. In one embodiment, the outer flange 536 has a generally rectangular shape, but may have any suitable shape, to mate with and be disposed or captured within the retainer flange 506 of the isolator plate 500 to form an interference fit that prevents water entry into the dielectric fitting 490 that may defeat the dielectric function. The isolator cover 528 includes an inner flange 538 extending along an inner perimeter thereof and axially away from the planar portion 530 and the isolator plate 500 to form a drip lip that prevents wicking between the isolator cover 528 and the flange 512. In one embodiment, the inner flange 538 forms an aperture 540 having a generally octagonal shape, but may be any suitable shape, to mate with the outer surface 524 of the fluid connector portion 522 of the flange 512. The isolator cover 528 is made of a polymeric material and formed as an individual injection molded polymeric component. The isolator cover 528 is integral, unitary, and one-piece. It should be appreciated that the isolator cover 528 is a rigid member. It should also be appreciated that the isolator cover 528 is not adhered to the flange 512.

The dielectric fitting 490 further includes a reinforcement plate 542 disposed next to the isolator cover 528. In one embodiment, the reinforcement plate 542 is generally rectangular in shape, but may be any suitable shape, to be disposed next to the planar portion 530 of the isolator cover 528. The reinforcement plate 542 includes a planar portion 544 to abut a corresponding planar surface of the planar portion 530 of the isolator cover 528. The reinforcement plate 542 also includes at least one fastener through-aperture 546 extending axially through the planar portion 544. In one embodiment, the reinforcement plate 542 includes a plurality of the fastener through-apertures 546, for example four (4). The fastener through-apertures 546 are aligned with the fastener through-apertures 534 of the fastener portions 532 of the isolator cover 528. In one embodiment, the fastener through-apertures 546 are generally circular in shape, but may be any suitable shape. The reinforcement plate 542 includes an outer flange 548 extending along an outer perimeter or sides thereof and axially away from the planar portion 544 and the planar portion 530 of the isolator cover 528. The outer flange 548 forms a drip lip that prevents water and condensation from collecting and entering the dielectric fitting 490. In one embodiment, the reinforcement plate 542 includes an aperture 550 extending therethrough and having a generally octagonal shape, but may be any suitable shape, to be disposed about the outer surface 524 of the fluid connector portion 522 of the flange 512. The reinforcement plate 542 is made of a metal or metallic material. The reinforcement plate 542 is integral, unitary, and one-piece. It should be appreciated that the reinforcement plate 542 distributes or spreads out a force on the isolator cover 528.

The dielectric fitting 490 also includes at least one seal 552, for example an O-ring, disposed between the isolator plate 500 and at least one of the flange 512 and the connection portion 492 of the lower housing portion 118. In one embodiment, the dielectric fitting 490 includes a plurality of the seals 552, for example two (2). In one embodiment, the seals 552 are generally circular in shape, but may be any suitable shape, to form an O-ring. In one embodiment, a first one of the seals 552 is disposed between the flange 512 and the seal retaining portion 508 of the isolator plate 500 and a second one of the seals 522 is disposed between the seal retaining portion 508 and the connection portion 492 of the lower housing portion 118. The seals 552 are relatively flexible and made of a plastic or elastomeric material. Each of the seals 552 is integral, unitary, and one-piece.

The dielectric fitting 460 further includes at least one fastener 554 to fasten the dielectric fitting 490 to the connection portion 492 of the lower housing portion 418. In one embodiment, the dielectric fitting 490 includes a plurality of the fasteners 554, for example four (4). In one embodiment, each fastener 554 includes a head portion 556 extending radially and a shaft portion 558 extending axially from the head portion 554. The head portion 554 includes a recess 560 for a tool (not shown) such as a screwdriver and the head portion 554 contacts the planar portion 544 of the reinforcement plate 542 and the shaft portion 558 extends through the fastener through-apertures of the reinforcement plate 542, flange 512, isolator cover 528, and the isolator plate 500. The shaft portion 558 includes a plurality of threads 562 to threadably engage the threaded apertures 498 of the connection portion 492 of the lower housing portion 118. The fasteners 554 are made of a metal or metallic material. Each of the fasteners 554 is integral, unitary, and one-piece.

To assemble the dielectric fitting 490, the seals 552 are disposed next to the isolator plate 500. The isolator plate 500 is disposed next to the connection portion 492 of the lower housing portion 118 and the flange 512 is disposed next to the isolator plate 500. The flange 512 is then disposed next to the isolator plate 500. The isolator cover 528 is then disposed next to the flange 512 and the reinforcement plate 542 is disposed next to the isolator cover 528. The fasteners 554 extend through the dielectric fitting 490 and threadably engage the lower housing portion 118 to fasten the dielectric fitting 490 to the lower housing portion 118. It should be appreciated that the order of assembly of the dielectric fitting 490 may be varied.

Figure 17:
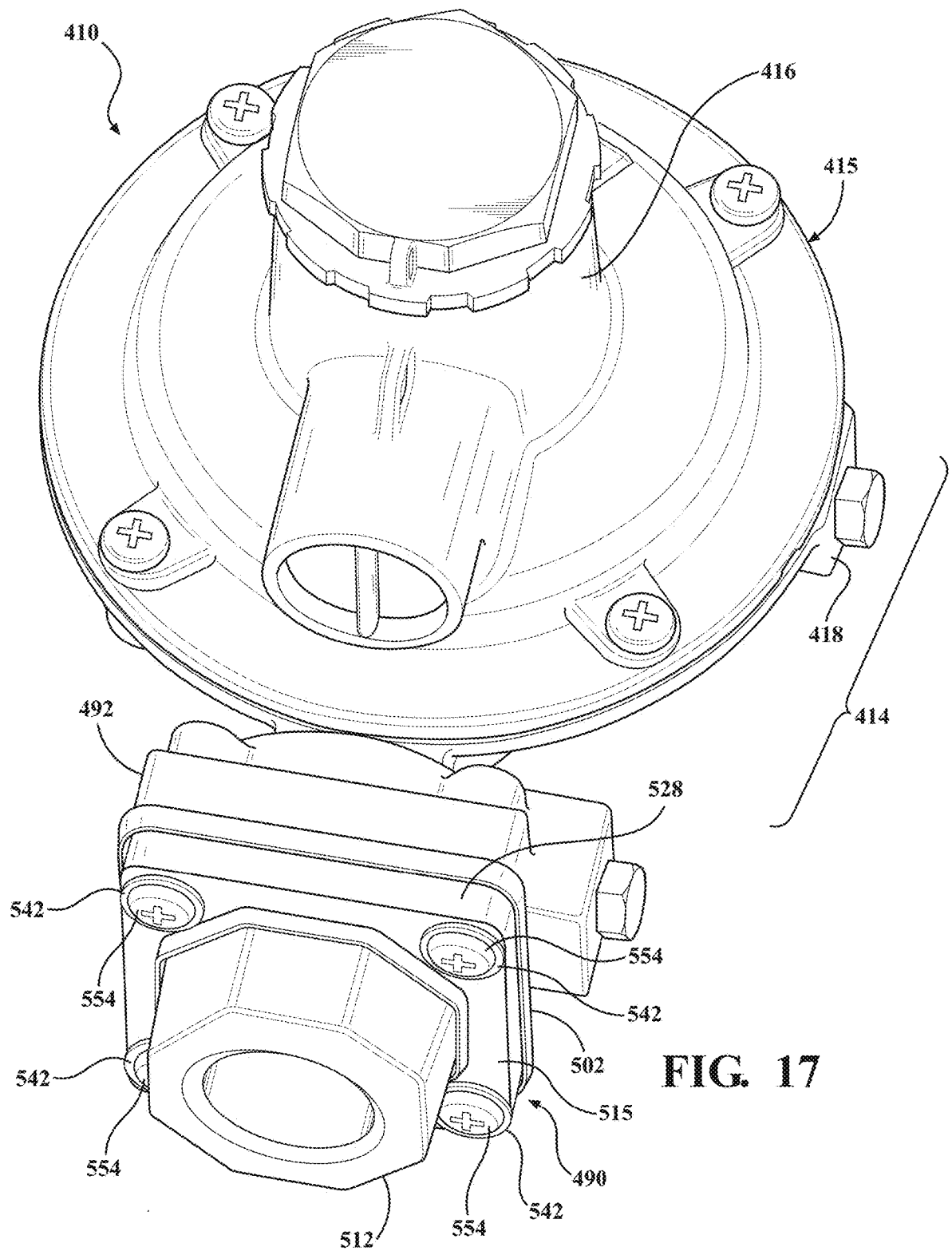
FIG. 17 is a perspective view of another embodiment, according to the present invention, of the dielectric fitting of FIGS. 10 and 11.

Referring to FIG. 17, another embodiment, according to the present invention, of the dielectric fitting 490 of FIGS. 10 and 11 is shown disposed next to the lower housing portion 418 of the pressure regulator 410. Like parts of the dielectric fitting 490 have like reference numerals. As illustrated in FIG. 17, the dielectric fitting 490 is disposed next to the connection portion 492 of the lower housing portion 418. In particular, the dielectric fitting 490 includes the isolator plate 500 disposed next or adjacent to the connection portion 492 of the lower housing portion 418, the flange 512 disposed next or adjacent to the isolator plate 500, and the isolator cover 528 disposed next to the flange 512 and the isolator plate 500. In this embodiment, the dielectric fitting 490 also includes a plurality of reinforcement plates 542 disposed next to the isolator cover 528 and a plurality of fasteners 554 to fasten the dielectric fitting 490 to the connection portion 492 of the lower housing portion 418. As illustrated, the dielectric fitting 490 includes four (4) reinforcement plates 542 and four (4) fasteners 554.

Figure 18A:
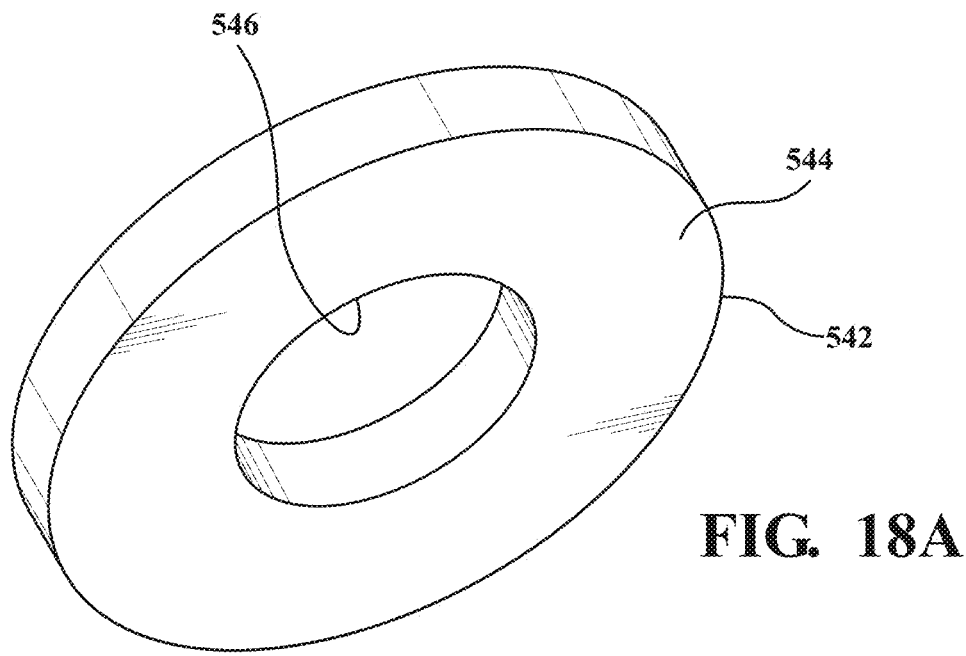
FIGS. 18A and 18B are perspective views of a reinforcement plate of the dielectric fitting of FIG. 17.
Figure 18B:
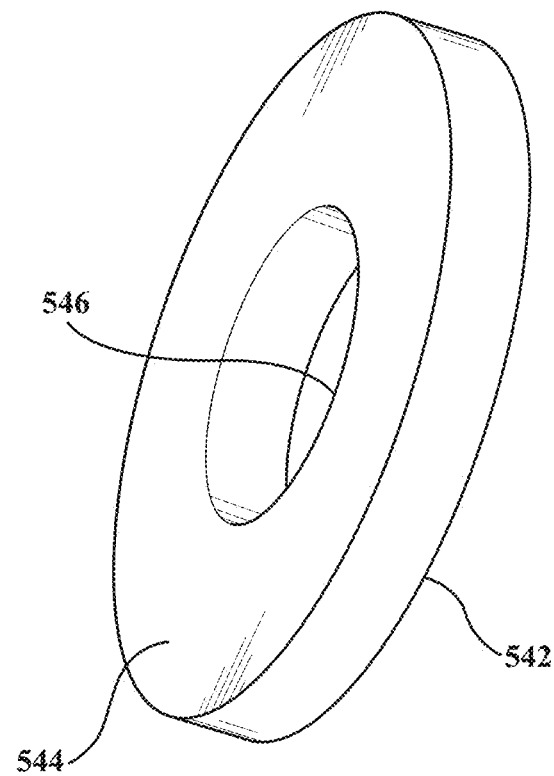

As illustrated in FIGS. 18A and 18B, in this embodiment, each reinforcement plate 542 is generally circular in shape, but may be any suitable shape, to contact the planar portion 530 of the isolator cover 528. Each reinforcement plate 542 includes a planar portion 544 to abut the corresponding planar top surface 515 of the planar portion 530 of the isolator cover 528. Each reinforcement plate 542 also includes at least one fastener through-aperture 546 extending axially through the planar portion 544. The fastener through-aperture 546 is aligned with one of the fastener through-apertures 534 of the fastener portions 532 of the isolator cover 528. In this embodiment, the fastener through-aperture 546 is generally circular in shape, but may be any suitable shape. Each reinforcement plate 542 is made of a metal or metallic material. Each reinforcement plate 542 is integral, unitary, and one-piece. It should be appreciated that the fasteners 554 extend through the fastener through-apertures of the reinforcement plates 542, flange 512, isolator cover 528, and the isolator plate 500 of the dielectric fitting 490 and threadably engage the lower housing portion 118 to fasten the dielectric fitting 490 to the lower housing portion 118.

Figure 19:
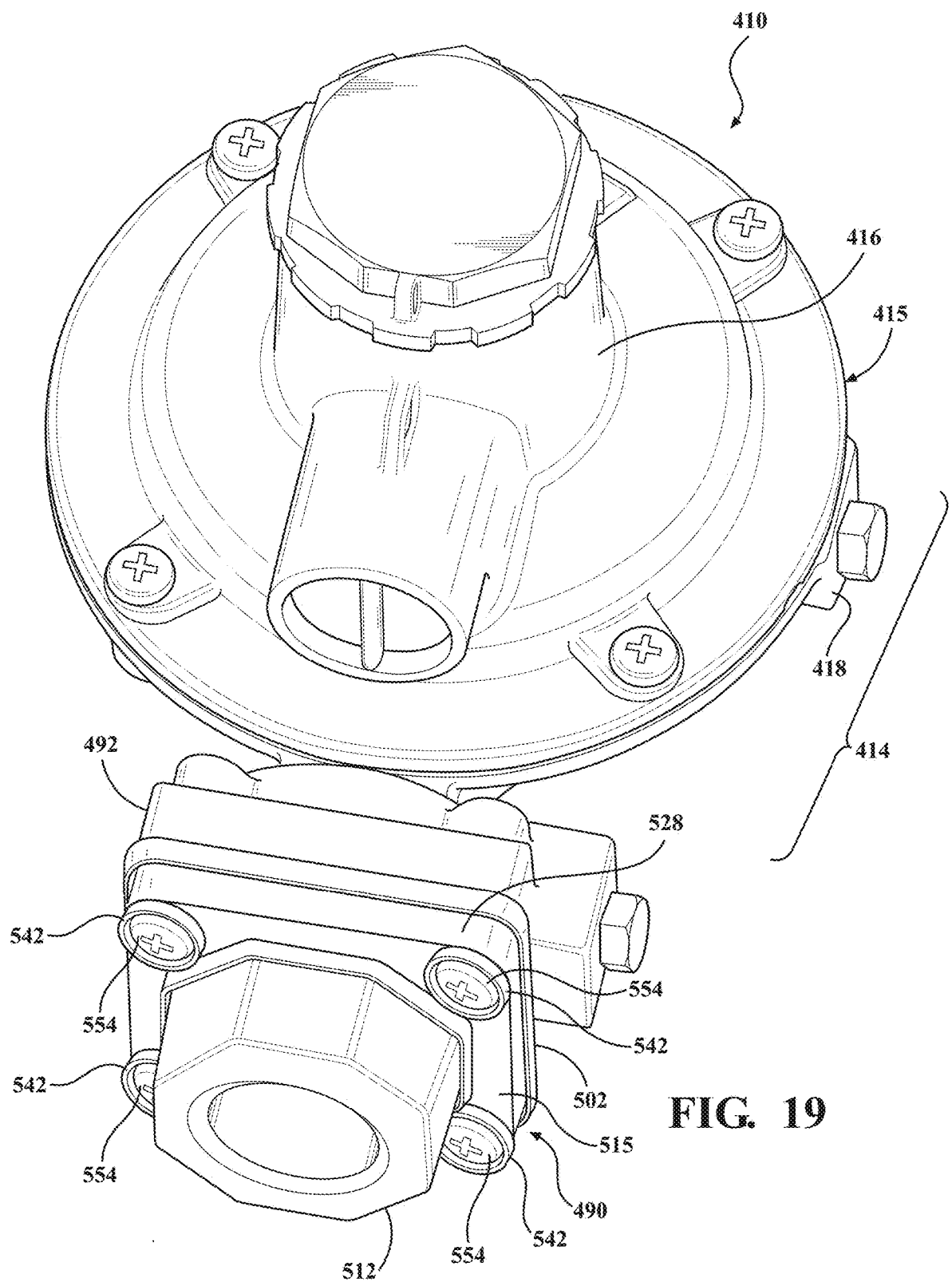
FIG. 19 is a perspective view of yet another embodiment, according to the present invention, of the dielectric fitting of FIGS. 10 and 11.
Figure 20A:
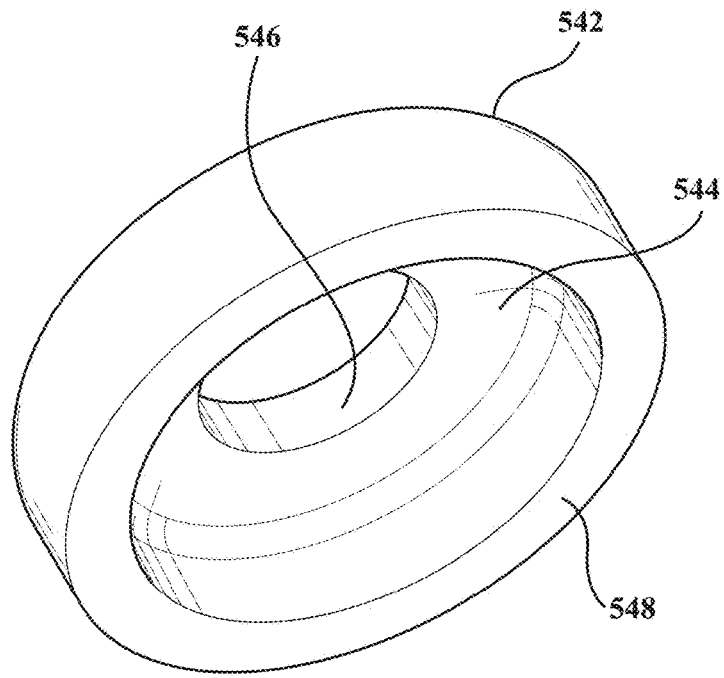
FIGS. 20A and 20B are perspective views of a reinforcement plate of the dielectric fitting of FIG. 19.
Figure 20B:
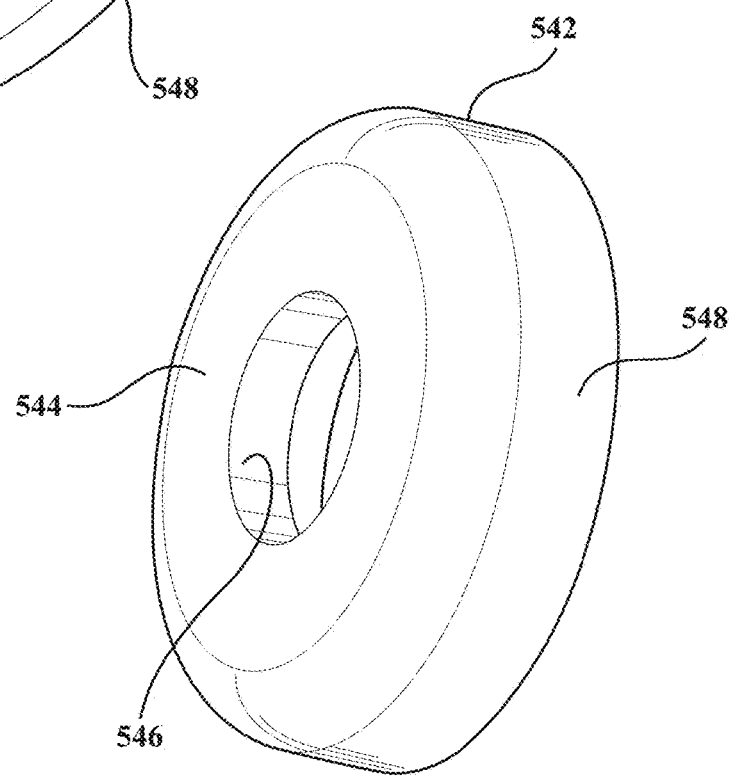

Referring to FIG. 19, yet another embodiment, according to the present invention, of the dielectric fitting 490 of FIGS. 10 and 11 is shown disposed next to the lower housing portion 418 of the pressure regulator 410. Like parts of the dielectric fitting 490 have like reference numerals. As illustrated in FIG. 19, the dielectric fitting 490 is disposed next to the connection portion 492 of the lower housing portion 418. In particular, the dielectric fitting 490 includes the isolator plate 500 disposed next or adjacent to the connection portion 492 of the lower housing portion 418, the flange 512 disposed next or adjacent to the isolator plate 500, and the isolator cover 528 disposed next to the flange 512 and the isolator plate 500. In this embodiment, the dielectric fitting 490 also includes a plurality of reinforcement plates 542 disposed next to the isolator cover 528 and a plurality of fasteners 554 to fasten the dielectric fitting 490 to the connection portion 492 of the lower housing portion 418. As illustrated, the dielectric fitting 490 includes four (4) reinforcement plates 542 and four (4) fasteners 554.

As illustrated in Figures, 20A and 20B, in this embodiment, each reinforcement plate 542 is generally circular in shape, but may be any suitable shape, to contact the planar portion 530 of the isolator cover 528. Each reinforcement plate 542 includes a planar portion 544 to abut the corresponding planar top surface 515 of the planar portion 530 of the isolator cover 528. Each reinforcement plate 542 also includes at least one fastener through-aperture 546 extending axially through the planar portion 544. The fastener through-aperture 546 is aligned with one of the fastener through-apertures 534 of the fastener portions 532 of the isolator cover 528. In this embodiment, the fastener through-aperture 546 is generally circular in shape, but may be any suitable shape. Each reinforcement plate 542 includes an outer flange 548 extending along an outer perimeter or side thereof and axially away from the planar portion 544 and the planar portion 530 of the isolator cover 528. The outer flange 548 forms a drip lip that prevents water and condensation from collecting and entering the dielectric fitting 490. Each reinforcement plate 542 is made of a metal or metallic material. Each reinforcement plate 542 is integral, unitary, and one-piece.

Figure 21:
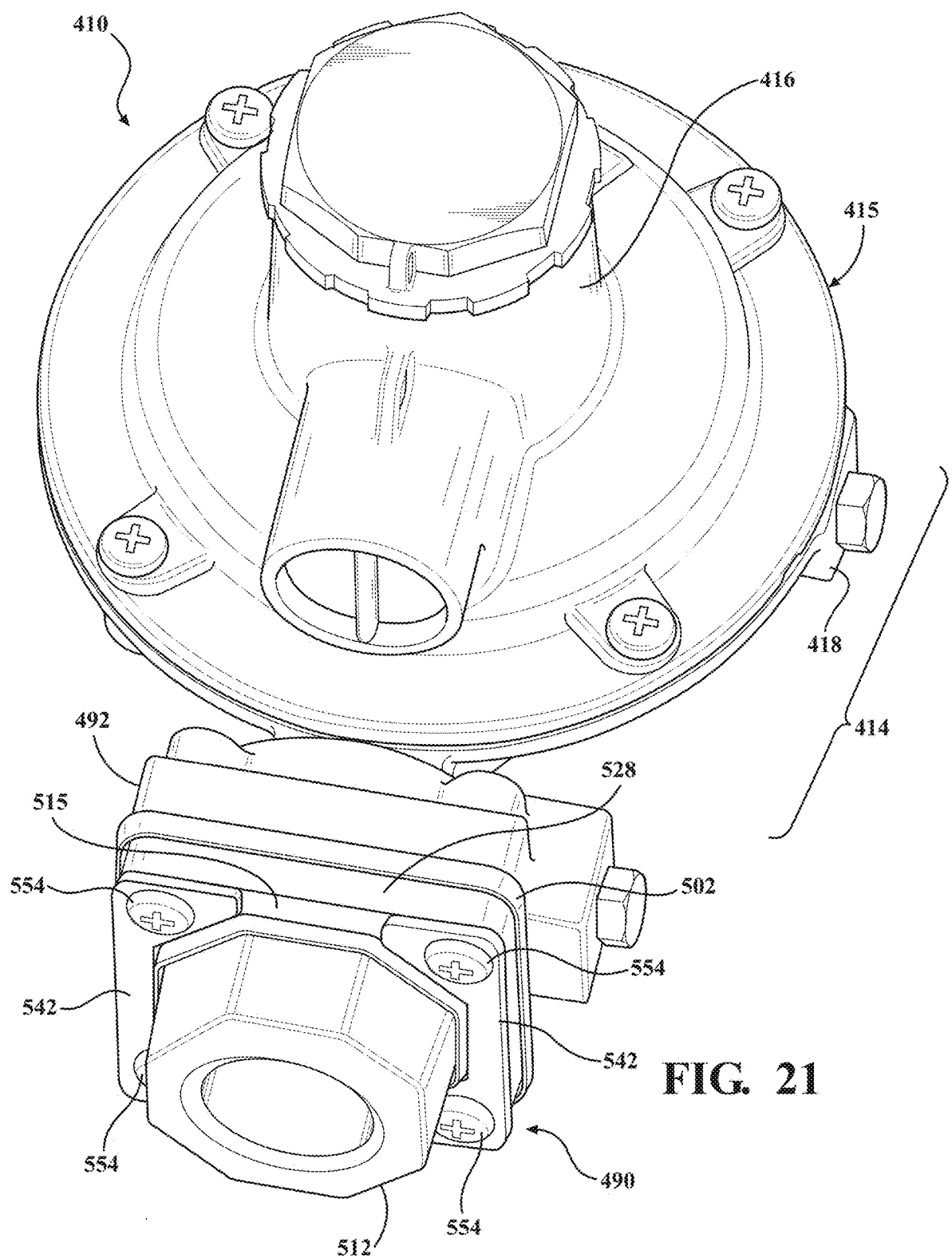
FIG. 21 is a perspective view of still another embodiment, according to the present invention, of the dielectric fitting of FIGS. 10 and 11.
Figure 22A:
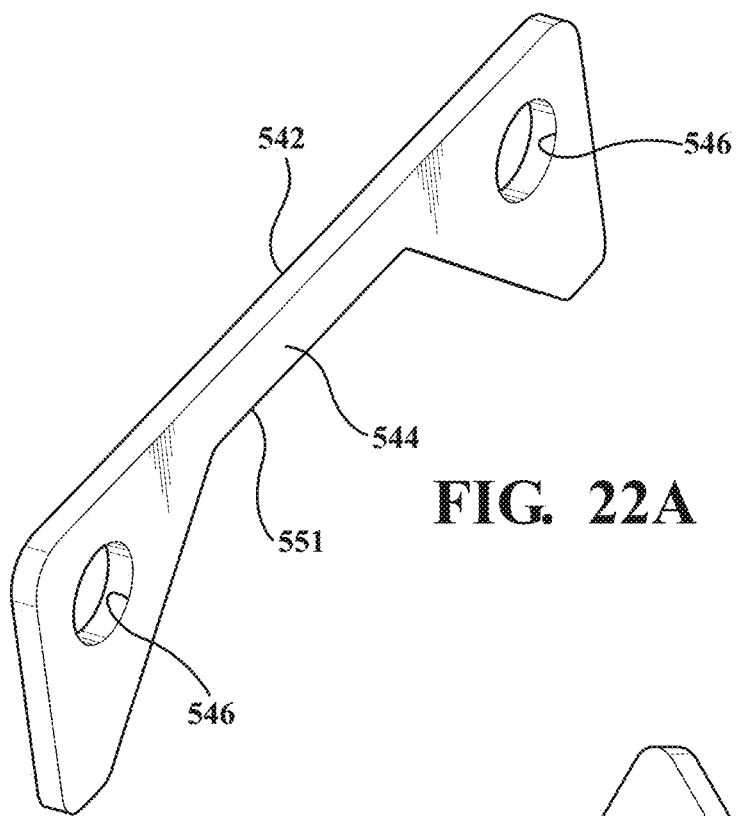
FIGS. 22A and 22B are perspective views of a reinforcement plate of the dielectric fitting of FIG. 21.
Figure 22B:
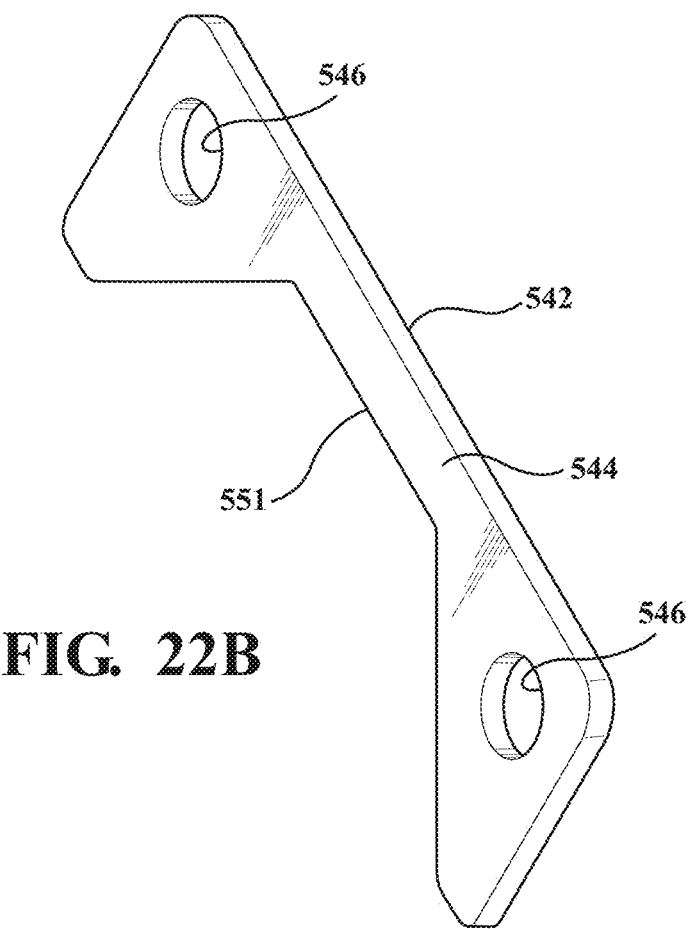

Referring to FIG. 21, still another embodiment, according to the present invention, of the dielectric fitting 490 of FIGS. 10 and 11 is shown disposed next to the lower housing portion 418 of the pressure regulator 410. Like parts of the dielectric fitting 490 have like reference numerals. As illustrated in FIG. 21, the dielectric fitting 490 is disposed next to the connection portion 492 of the lower housing portion 418. In particular, the dielectric fitting 490 includes the isolator plate 500 disposed next or adjacent to the connection portion 492 of the lower housing portion 418, the flange 512 disposed next or adjacent to the isolator plate 500, and the isolator cover 528 disposed next to the flange 512 and the isolator plate 500. In this embodiment, the dielectric fitting 490 also includes a plurality of reinforcement plates 542 disposed next to the isolator cover 528 and a plurality of fasteners 554 to fasten the dielectric fitting 490 to the connection portion 492 of the lower housing portion 418. As illustrated, the dielectric fitting 490 includes two (2) reinforcement plates 542 and four (4) fasteners 554.

As illustrated in Figures, 22A and 22B, in this embodiment, each reinforcement plate 542 is generally rectangular in shape, but may be any suitable shape, to contact the planar portion 530 of the isolator cover 528. Each reinforcement plate 542 includes a planar portion 544 to abut the corresponding planar top surface 515 of the planar portion 530 of the isolator cover 528. Each reinforcement plate 542 also includes at least one fastener through-aperture 546 extending axially through the planar portion 544. In this embodiment, each reinforcement plate 542 includes a plurality of the fastener through-apertures 546, for example two (2). The fastener through-apertures 546 are aligned with two of the fastener through-apertures 534 of the fastener portions 532 of the isolator cover 528. In this embodiment, the fastener through-apertures 546 are generally circular in shape, but may be any suitable shape. In this embodiment, the reinforcement plate 542 includes a recess 551 extending transversely inward along one side thereof to form three sides of a generally octagonal shape, but may be any suitable shape, to contact or be disposed partially about the outer surface 524 of the fluid connector portion 522 of the flange 512. Each reinforcement plate 542 is made of a metal or metallic material. Each reinforcement plate 542 is integral, unitary, and one-piece.

Figure 23:
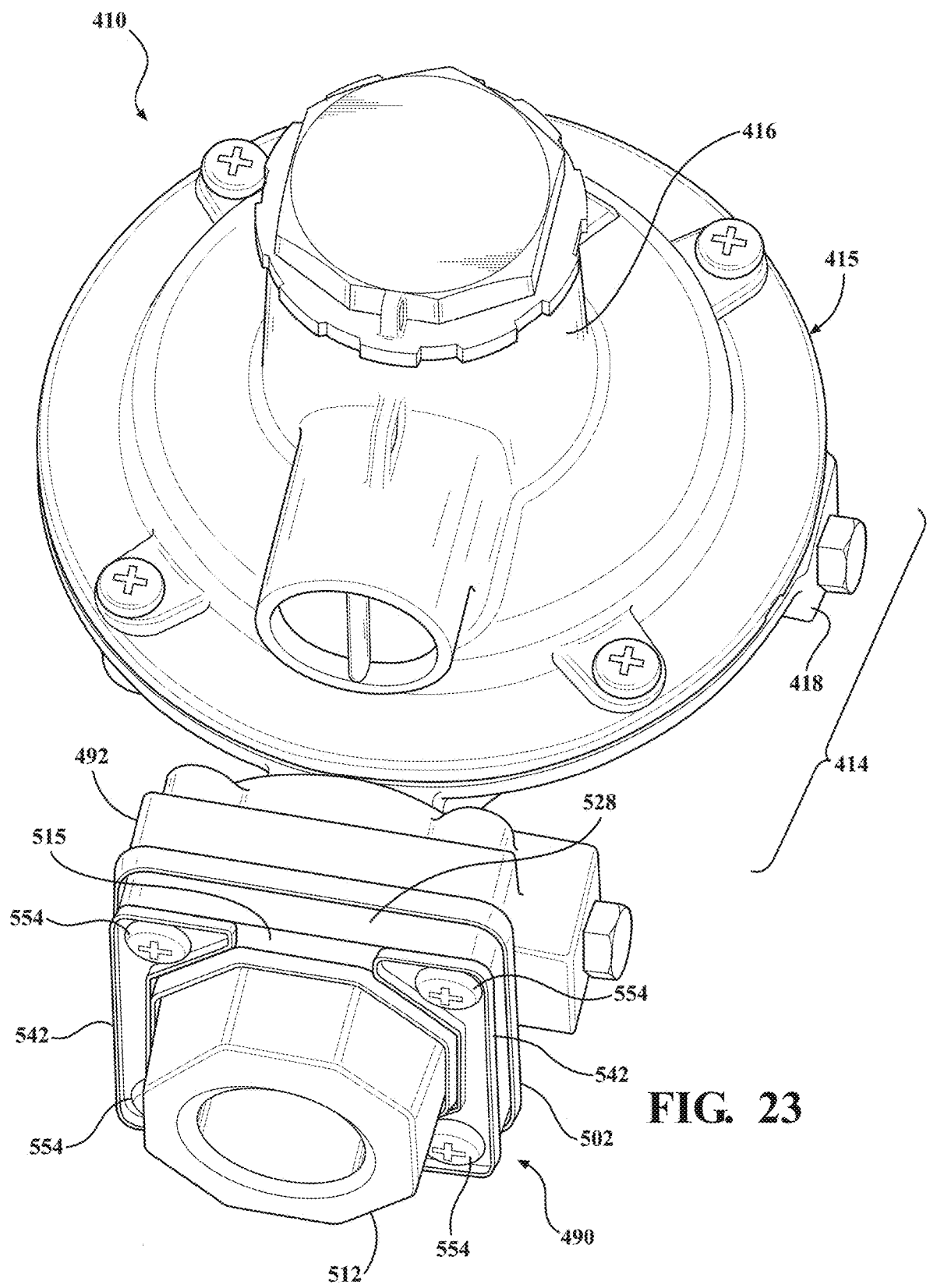
FIG. 23 is a perspective view of a further embodiment, according to the present invention, of the dielectric fitting of FIGS. 10 and 11.
Figure 24A:
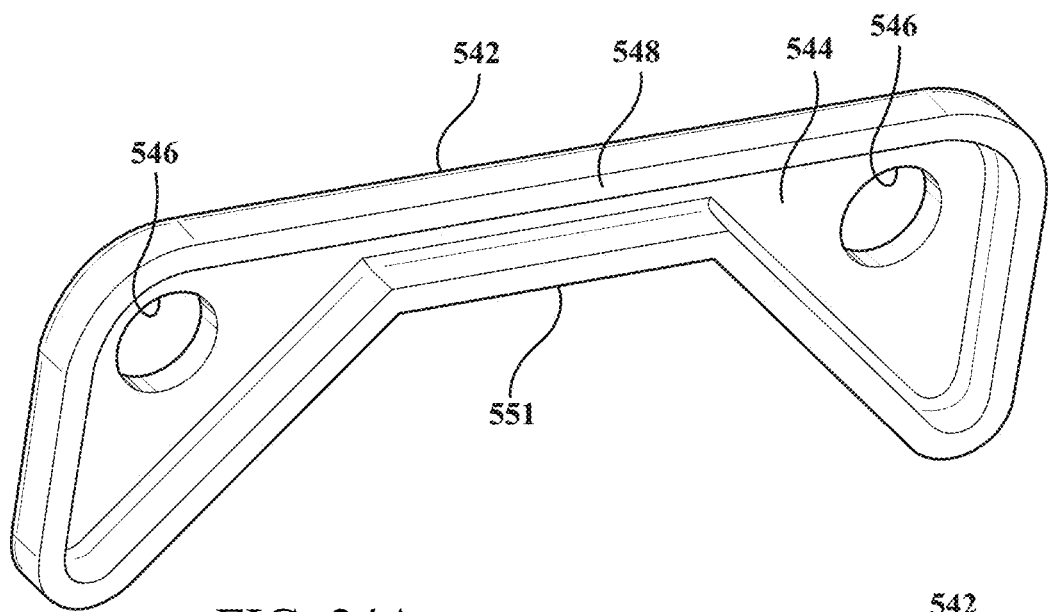
FIGS. 24A and 24B are perspective views of a reinforcement plate of the dielectric fitting of FIG. 23.
Figure 24B:
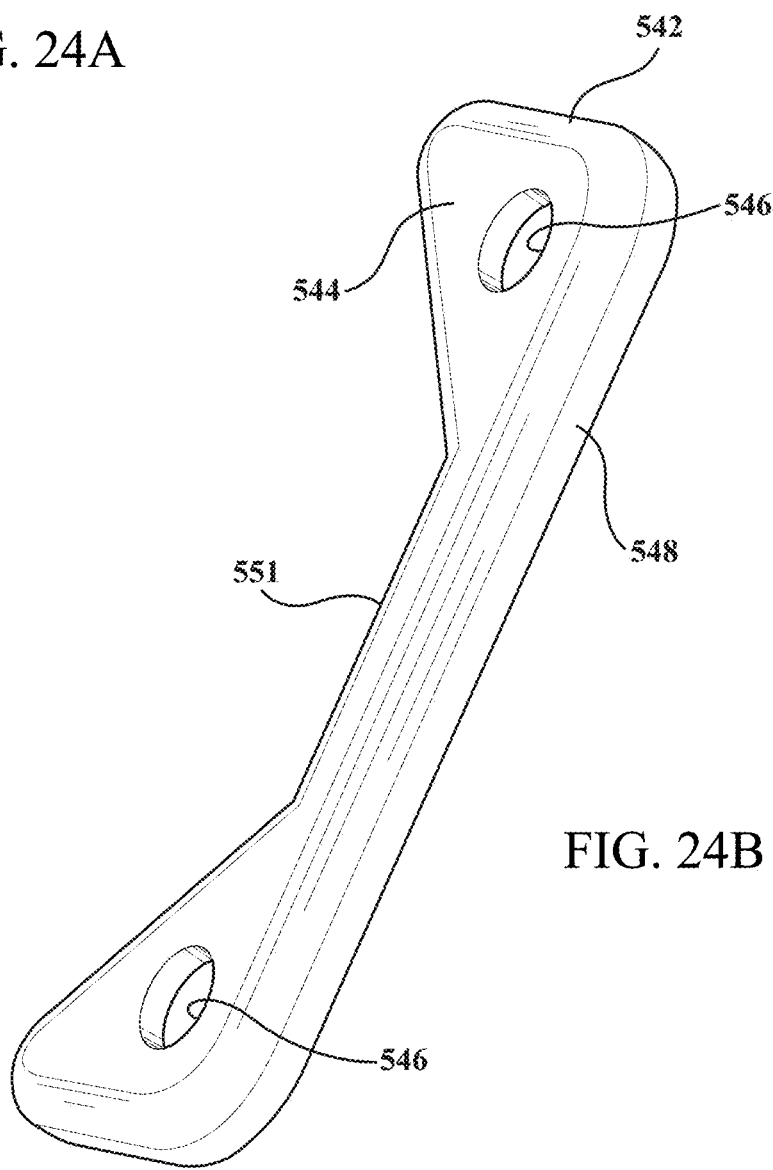

Referring to FIG. 23, a further embodiment, according to the present invention, of the dielectric fitting 490 of FIGS. 10 and 11 is shown disposed next to the lower housing portion 418 of the pressure regulator 410. Like parts of the dielectric fitting 490 have like reference numerals. As illustrated in FIG. 23, the dielectric fitting 490 is disposed next to the connection portion 492 of the lower housing portion 418. In particular, the dielectric fitting 490 includes the isolator plate 500 disposed next or adjacent to the connection portion 492 of the lower housing portion 418, the flange 512 disposed next or adjacent to the isolator plate 500, and the isolator cover 528 disposed next to the flange 512 and the isolator plate 500. In this embodiment, the dielectric fitting 490 also includes a plurality of reinforcement plates 542 disposed next to the isolator cover 528 and a plurality of fasteners 554 to fasten the dielectric fitting 490 to the connection portion 492 of the lower housing portion 418. As illustrated, the dielectric fitting 490 includes two (2) reinforcement plates 542 and four (4) fasteners 554.

As illustrated in Figures, 24A and 24B, in this embodiment, each reinforcement plate 542 is generally rectangular in shape, but may be any suitable shape, to contact the planar portion 530 of the isolator cover 528. Each reinforcement plate 542 includes a planar portion 544 to abut the corresponding planar top surface 515 of the planar portion 530 of the isolator cover 528. Each reinforcement plate 542 also includes at least one fastener through-aperture 546 extending axially through the planar portion 544. In this embodiment, each reinforcement plate 542 includes a plurality of the fastener through-apertures 546, for example two (2). The fastener through-apertures 546 are aligned with two of the fastener through-apertures 534 of the fastener portions 532 of the isolator cover 528. In this embodiment, the fastener through-apertures 546 are generally circular in shape, but may be any suitable shape. Each reinforcement plate 542 includes an outer flange 548 extending along an outer perimeter or side thereof and axially away from the planar portion 544 and the planar portion 530 of the isolator cover 528. The outer flange 548 forms a drip lip that prevents water and condensation from collecting and entering the dielectric fitting 490. In this embodiment, the reinforcement plate 542 includes a recess 551 extending transversely inward along one side thereof to form three sides of a generally octagonal shape, but may be any suitable shape, to be contact or be disposed partially about the outer surface 524 of the fluid connector portion 522 of the flange 512. Each reinforcement plate 542 is made of a metal or metallic material. Each reinforcement plate 542 is integral, unitary, and one-piece.

Accordingly, the reinforcement plate(s) 542 of the dielectric fitting 490 of the present invention distributes clamping loads over a larger area of the polymeric isolator cover 528, reducing creep, set, and relaxation that can cause deflection under mechanical load leading to leaks at the flange connection. The dielectric fitting 490 of the present invention prevents water and condensation from collecting and entering. The dielectric fitting 490 of the present invention prevents wicking between the isolator cover 528 and the flange 512. The dielectric fitting 490 of the present invention prevents water from entering that could defeat the dielectric function when installed as intended. The dielectric fitting 490 of the present invention allows inspectors to readily identify pressure regulators with dielectric fittings 490 installed.

Embodiments of the present invention have been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A dielectric fitting for a pressure regulator comprising:
a flange adapted to be disposed next to a housing of the pressure regulator, said flange including a passageway extending axially and at least one fastener through-aperture spaced radially from said passageway and extending axially therethrough;
an isolator plate disposed next to said flange and adapted to be disposed between said flange and the housing, said isolator plate including a planar portion having a central opening extending axially therethrough and at least one fastener through-aperture spaced radially from said central opening and extending axially therethrough, said central opening communicating with said passageway;
an isolator cover disposed next to said flange and said isolator plate to electrically isolate said flange from the housing, said isolator cover including a planar portion to abut said flange and having a central opening extending axially therethrough and coaxial with said central opening of said isolator plate, said planar portion having at least one fastener portion extending axially from said planar portion and disposed in said at least one fastener through-aperture of said flange, said at least one fastener portion having at least one fastener through-aperture extending axially therethrough; and
at least one fastener extending through said at least one fastener through-aperture of said flange, said at least one fastener through-aperture of said isolator cover, and said at least one fastener through-aperture of said isolator plate and adapted to fasten to the housing.

2. A dielectric fitting as set forth in claim 1 wherein said isolator plate is made of a polymeric material.

3. A dielectric fitting as set forth in claim 2 wherein said isolator cover is made of a polymeric material.

4. A dielectric fitting as set forth in claim 3 wherein said flange is made of a metal material.

5. A dielectric fitting as set forth in claim 4 wherein said isolator plate and said isolator cover are formed as individual injection molded polymeric components.

6. A dielectric fitting as set forth in claim 1 wherein said isolator plate includes a ring portion extending axially from an inner periphery of said planar portion and forming said central opening, and an outer flange extending axially from an outer periphery of said planar portion.

7. A dielectric fitting as set forth in claim 6 wherein said flange includes a base portion at one end to matingly engage said ring portion and a fluid connector portion extending axially from said base portion and having a passageway extending axially therethrough for fluid flow, said base including said at least one fastener through-aperture extending axially therethrough.

8. A dielectric fitting as set forth in claim 1 including at least one seal disposed between said isolator plate and said flange.

9. A dielectric fitting for a pressure regulator comprising:
a flange adapted to be disposed next to a housing of the pressure regulator, said flange including at least one fastener through-aperture extending axially therethrough;
an isolator plate disposed next to said flange and adapted to be disposed between said flange and the housing, said isolator plate including a planar portion having at least one fastener through-aperture extending axially therethrough;
an isolator cover disposed next to said flange and said isolator plate to electrically isolate said flange from the housing, said isolator cover including at least one fastener portion disposed in said at least one fastener through-aperture of said flange and having at least one fastener through-aperture extending axially therethrough;
at least one fastener extending through said at least one fastener through-aperture of said flange, said at least one fastener through-aperture of said isolator cover, and said at least one fastener through-aperture of said isolator plate and adapted to fasten to the housing;
wherein said isolator plate includes a ring portion extending axially from an inner periphery of said planar portion, and an outer flange extending axially from an outer periphery of said planar portion;
wherein said flange includes a base portion at one end to matingly engage said ring portion and a fluid connector portion extending axially from said base portion and having a passageway extending axially therethrough for fluid flow, said base including said at least one fastener through-aperture extending axially therethrough;
wherein said isolator cover includes a planar portion to abut said base portion of said flange and said at least one fastener portion extending axially from said planar portion; and
wherein said isolator cover includes an outer flange extending axially from an outer periphery of said planar portion of said isolator cover and disposed about an outer periphery of said base portion of said flange and within said outer flange of said isolator plate, and an inner flange extending axially from an inner periphery of said planar portion of said isolator cover and disposed about an outer periphery of said fluid connector portion of said flange.

10. A dielectric fitting as set forth in claim 1 including at least one reinforcement plate disposed adjacent said isolator cover.

11. A dielectric fitting as set forth in claim 10 wherein said at least one reinforcement plate includes a planar portion and at least one fastener through-aperture extending through said planar portion.

12. A dielectric fitting as set forth in claim 11 wherein said at least one reinforcement plate includes an outer flange extending axially from an outer periphery of said planar portion of said at least one reinforcement plate.

13. A dielectric fitting as set forth in claim 10 wherein said at least one reinforcement plate is made of a metal material.

14. A dielectric fitting for a pressure regulator comprising:
a flange made of a metal material and adapted to be disposed next to a housing of the pressure regulator, said flange including a passageway extending axially and at least one fastener through-aperture spaced radially from said passageway and extending axially therethrough;
an isolator plate made of a polymeric material and coupled to said flange and adapted to be disposed between said flange and the housing, said isolator plate including a planar portion having a central opening extending axially therethrough and at least one fastener through-aperture extending axially therethrough, said central opening communicating with said passageway;
an isolator cover made of a polymeric material and disposed next to said flange and said isolator plate to electrically isolate said flange from the housing, said isolator cover including a planar portion to abut said flange and having a central opening extending axially therethrough and coaxial with said central opening of said isolator plate, said planar portion having at least one fastener portion extending axially from said planar portion and disposed in said at least one fastener through-aperture of said flange, said at least one fastener portion having at least one fastener through-aperture extending axially therethrough;
a reinforcement plate made of a metal material disposed adjacent said isolator cover, said reinforcement plate including at least one fastener through-aperture extending axially therethrough;
at least one seal disposed between said isolator plate and said flange; and
at least one fastener extending through said at least one fastener through-aperture of said reinforcement plate, said at least one fastener through-aperture of said flange, said at least one fastener through-aperture of said isolator cover, and said at least one fastener through-aperture of said isolator plate and adapted to fasten to the housing.

15. A dielectric fitting for a pressure regulator comprising:
a flange made of a metal material and adapted to be disposed next to a housing of the pressure regulator, said flange including a passageway extending axially and at least one fastener through-aperture spaced radially from said passageway and extending axially therethrough;
an isolator plate made of a polymeric material and coupled to said flange and adapted to be disposed between said flange and the housing, said isolator plate including a planar portion having a central opening extending axially therethrough and at least one fastener through-aperture extending axially therethrough, said central opening communicating with said passageway;
an isolator cover made of a polymeric material and disposed next to said flange and said isolator plate to electrically isolate said flange from the housing, said isolator cover including a planar portion to abut said flange and having a central opening extending axially therethrough and coaxial with said central opening of said isolator plate, said planar portion having at least one fastener portion extending axially from said planar portion and disposed in said at least one fastener through-aperture of said flange, said at least one fastener portion having at least one fastener through-aperture extending axially therethrough;
a plurality of reinforcement plates made of a metal material disposed adjacent said isolator cover, said reinforcement plates including at least one fastener through-aperture extending axially therethrough;

at least one seal disposed between said isolator plate and said flange; and a plurality of fasteners extending through said at least one fastener through-aperture of said reinforcement plates, said at least one fastener through-aperture of said flange, said at least one fastener through-aperture of said isolator cover, and said at least one fastener through-aperture of said isolator plate and adapted to fasten to the housing.

16. A dielectric fitting as set forth in claim 15 wherein each of said reinforcement plates is generally circular in shape and includes a planar portion and said at least one fastener through-aperture extending axially through said planar portion.

17. A dielectric fitting for a pressure regulator comprising:

a flange made of a metal material and adapted to be disposed next to a housing of the pressure regulator, said flange including at least one fastener through-aperture extending axially therethrough;

an isolator plate made of a polymeric material and coupled to said flange and adapted to be disposed between said flange and the housing, said isolator plate including a planar portion having at least one fastener through-aperture extending axially therethrough;

an isolator cover made of a polymeric material and disposed next to said flange and said isolator plate to electrically isolate said flange from the housing, said isolator cover including at least one fastener portion disposed in said at least one fastener through-aperture of said flange and having at least one fastener through-aperture extending axially therethrough;

a plurality of reinforcement plates made of a metal material disposed adjacent said isolator cover, said reinforcement plates including at least one fastener through-aperture extending axially therethrough;

at least one seal disposed between said isolator plate and said flange;

a plurality of fasteners extending through said at least one fastener through-aperture of said reinforcement plates, said at least one fastener through-aperture of said flange, said at least one fastener through-aperture of said isolator cover, and said at least one fastener through-aperture of said isolator plate and adapted to fasten to the housing;

wherein each of said reinforcement plates is generally circular in shape and includes a planar portion and said at least one fastener through-aperture extending axially through said planar portion; and wherein each of said reinforcement plates include an outer flange extending axially from an outer periphery of said planar portion.

18. A dielectric fitting for a pressure regulator comprising:

a flange made of a metal material and adapted to be disposed next to a housing of the pressure regulator, said flange including at least one fastener through-aperture extending axially therethrough;

an isolator plate made of a polymeric material and coupled to said flange and adapted to be disposed between said flange and the housing, said isolator plate including a planar portion having at least one fastener through-aperture extending axially therethrough;

an isolator cover made of a polymeric material and disposed next to said flange and said isolator plate to electrically isolate said flange from the housing, said isolator cover including at least one fastener portion disposed in said at least one fastener through-aperture of said flange and having at least one fastener through-aperture extending axially therethrough;

a plurality of reinforcement plates made of a metal material disposed adjacent said isolator cover, said reinforcement plates including at least one fastener through-aperture extending axially therethrough;

at least one seal disposed between said isolator plate and said flange;

a plurality of fasteners extending through said at least one fastener through-aperture of said reinforcement plates, said at least one fastener through-aperture of said flange, said at least one fastener through-aperture of said isolator cover, and said at least one fastener through-aperture of said isolator plate and adapted to fasten to the housing; and wherein each of said reinforcement plates is generally rectangular in shape and includes a planar portion, said at least one fastener through aperture comprising a plurality of fastener through-apertures extending through said planar portion, and a recess extending transversely inward along one side thereof.

19. A dielectric fitting as set forth in claim 18 wherein each of said reinforcement plates include an outer flange extending axially from an outer periphery of said planar portion.

20. A pressure regulator comprising:

a housing having an upper housing portion and a lower housing portion and defining an inlet and an outlet, said housing defining a passageway in communication with one of said inlet and said outlet;

a diaphragm captured between said upper housing portion and said lower housing portion to define upper and lower pressure chambers;

a valve body disposed in said passageway and movable between a plurality of operational positions; and a dielectric fitting disposed next to a connection portion of said lower housing portion for one of said inlet and said outlet, said dielectric fitting comprising a flange, said flange including a passageway extending axially and at least one fastener through-aperture spaced radially from said passageway and extending axially therethrough, an isolator plate disposed between said flange and the connection portion, said isolator plate including a planar portion having a central opening extending axially therethrough and at least one fastener through-aperture extending axially therethrough, said central opening communicating with said passageway, and an isolator cover disposed next to said flange and said isolator plate to electrically isolate said flange from said lower housing portion, said isolator cover including a planar portion to abut said flange and having a central opening extending axially therethrough and coaxial with said central opening of said isolator plate, said planar portion having at least one fastener portion extending axially from said planar portion and disposed in said at least one fastener through-aperture of said flange, said at least one fastener portion having at least one fastener through-aperture extending axially therethrough; and at least one fastener extending through said at least one fastener through-aperture of said flange, said at least one fastener through-aperture of said isolator cover, and said at least one fastener through-aperture of said isolator plate and adapted to fasten to the housing and threadably engaging at least one threaded aperture of said lower housing portion.

21. A pressure regulator as set forth in claim 20 wherein said isolator plate is made of a polymeric material.

22. A pressure regulator as set forth in claim 21 wherein said isolator cover is made of a polymeric material.

23. A pressure regulator as set forth in claim 22 wherein said flange is made of a metal material.

24. A pressure regulator as set forth in claim 23 wherein said isolator plate and said isolator cover are formed as individual injection molded polymeric components.

25. A pressure regulator as set forth in claim 20 wherein said dielectric fitting includes at least one reinforcement plate disposed adjacent said isolator cover.

26. A pressure regulator as set forth in claim 20 wherein said dielectric fitting includes a first seal disposed between said flange and said isolator plate and a second seal disposed between said isolator plate and said lower housing portion.

* * * * *